(12) United States Patent
Wang et al.

(10) Patent No.: US 10,668,626 B2
(45) Date of Patent: Jun. 2, 2020

(54) SERIES-PARALLEL MOVABLE HEAVY-LOAD CASTING ROBOT

(71) Applicant: Anhui University of Science and Technology, Huainan (CN)

(72) Inventors: Chengjun Wang, Huainan (CN); Yongcun Guo, Huainan (CN); Runrun Ren, Huainan (CN); Yuzhe Shen, Huainan (CN); Yan Zheng, Huainan (CN); Long Li, Huainan (CN); Hongtao Yang, Huainan (CN); Jun Zhang, Huainan (CN); Peng Wang, Huainan (CN)

(73) Assignee: ANHUI UNIVERSITY OF SCIENCE AND TECHNOLOGY, Huainan (CN)

( * ) Notice: Subject to any disclaimer, the term of this patent is extended or adjusted under 35 U.S.C. 154(b) by 172 days.

(21) Appl. No.: 16/075,144

(22) PCT Filed: Oct. 31, 2017

(86) PCT No.: PCT/CN2017/108814
§ 371 (c)(1),
(2) Date: Aug. 3, 2018

(87) PCT Pub. No.: WO2019/029027
PCT Pub. Date: Feb. 14, 2019

(65) Prior Publication Data
US 2019/0366556 A1     Dec. 5, 2019

(30) Foreign Application Priority Data
Aug. 10, 2017   (CN) .......................... 2017 1 0682225

(51) Int. Cl.
*B25J 15/02*        (2006.01)
*B25J 11/00*        (2006.01)
(Continued)

(52) U.S. Cl.
CPC ............. *B25J 11/005* (2013.01); *B22D 37/00* (2013.01); *B25J 5/007* (2013.01); *B25J 15/0019* (2013.01); *B25J 15/02* (2013.01); *B25J 19/021* (2013.01)

(58) Field of Classification Search
CPC ..... B25J 11/00; B25J 5/00; B25J 19/02; B25J 15/02; B25J 9/1687
See application file for complete search history.

(56) References Cited

U.S. PATENT DOCUMENTS 4,489,926 A * 12/1984 Blatrix ..................... B23Q 3/10
                                                            269/235
4,612,946 A *  9/1986 Noh ........................ B23P 19/06
                                                            134/140

(Continued)

FOREIGN PATENT DOCUMENTS

CN         101372036 A     2/2009
CN         101559593 A    10/2009
(Continued)

*Primary Examiner* — Rina I Duda
(74) *Attorney, Agent, or Firm* — Bayramoglu Law Offices LLC

(57) ABSTRACT

A series-parallel movable heavy-load casting robot, includes a four-driving-wheel type moving platform, a rotating device, an upright assembly, a lifting drive device, a parallel working arm, an end actuator and a binocular vision system. The four-driving-wheel type moving platform is driven by adopting four omnidirectional wheels, the platform utilizes rear hydraulic supporting legs and adjustable hydraulic supporting legs to implement stationary point self-balancing supporting, and a robot body has five freedom degrees of motion in space; and the rotating device and the lifting drive device can respectively implement rotating and lifting adjustment, the four-degree-of-freedom parallel working
(Continued)

arm can carry out attitude adjustment for the end actuator, different end actuators can be changed according to working requirements.

10 Claims, 11 Drawing Sheets

(51) Int. Cl.
    *B22D 37/00*     (2006.01)
    *B25J 5/00*     (2006.01)
    *B25J 15/00*     (2006.01)
    *B25J 19/02*     (2006.01)

(56) References Cited

U.S. PATENT DOCUMENTS

| | | | | |
|---|---|---|---|---|
| 5,209,714 A * | 5/1993 | Sainte | ............... | A63B 21/0083 |
| | | | | 482/113 |
| 5,482,377 A * | 1/1996 | Osawa | .................. | B23Q 1/28 |
| | | | | 29/281.5 |
| 7,329,083 B2 * | 2/2008 | Nakazato | ............... | B65G 65/00 |
| | | | | 414/416.01 |
| 7,461,722 B2 * | 12/2008 | Kyotani | .................. | B66F 9/02 |
| | | | | 187/211 |
| 8,468,781 B2 * | 6/2013 | Fritzsche | ............... | B65B 35/52 |
| | | | | 53/447 |

FOREIGN PATENT DOCUMENTS

| | | |
|---|---|---|
| CN | 201493441 U | 6/2010 |
| CN | 202398803 U | 8/2012 |
| CN | 203592484 U | 5/2014 |
| CN | 103934439 A | 7/2014 |
| CN | 203830709 U | 9/2014 |
| CN | 204747420 U | 11/2015 |
| CN | 105459095 A | 4/2016 |
| CN | 105537572 A | 5/2016 |
| CN | 105817611 A | 8/2016 |
| CN | 106180666 A | 12/2016 |
| CN | 105108119 B | 5/2017 |
| CN | 106735141 A | 5/2017 |
| CN | 106737810 A | 5/2017 |
| CN | 206296441 U | 7/2017 |
| CN | 107243622 A | 10/2017 |
| CN | 207013711 U | 2/2018 |
| JP | 2003025337 A | 1/2003 |
| WO | 2010061022 A1 | 6/2010 |

* cited by examiner

SERIES-PARALLEL MOVABLE HEAVY-LOAD CASTING ROBOT

CROSS REFERENCE TO THE RELATED APPLICATIONS

This application is the national phase entry of International Application No. PCT/CN2017/108814, filed on Oct. 31, 2017, which is based on and claims priority from the Chinese patent Application No. 201710682225.3, filed on Aug. 10, 2017, the entire contents of which are incorporated herein by reference.

TECHNICAL FIELD

The present invention belongs to the technical field of casting robot equipment, and particularly relates to a series-parallel movable heavy-load casting robot.

BACKGROUND

High flexibility of an industrial robot can meet various special requirements in the modern green casting production, and adoption of the robot in the casting production not only can liberate operators from heavy and tedious manual labor and save labor, but also is the important means for improving production efficiency, manufacturing accuracy and quality for a casting and implementing mechanization, automation and civilization of casting production. Currently, adoption of advanced applicable new casting technologies, and improvement of the automation level of casting equipment, particularly application of a movable robot technology are key measures for casting enterprises to implement green casting production and realize sustainable development. Casting is carried out in harsh environments with a high temperature, a large amount of dust, vibration, oil stain, noise and electromagnetic interference, and the casting has a heavy weight, and thus, a common industrial robot cannot meet production requirements. If a casting robot is expected to be suitable for such working environments and normally run, there are still numerous key technologies in urgent need of research and breakthrough. The casting robot not only can be used for casting carrying and transfer in the die-casting and precision-casting production, but also can be used in processes of shaking, core making, core setting, pouring, clearing, inspection and the like of sand casting. Particularly, in the production of a middle-to-large sized castings, sizes and weights of both a sand core and the casting are relatively large, and for execution of core taking, core assembling, core setting, pouring and carrying operations, the difficulty is great with a high requirement. A high-flexibility heavy-load type casting robot which can meet requirements for the core taking, core assembling, core setting, pouring and carrying operations in the casting production is urgently required.

Currently, most of robots used in the casting production are articulated serial robots, which have the advantages of simple structure, convenience for control and large working space, but are poor in accuracy and low in load capacity and can only execute a light-load operation task. The articulated serial robot is difficult to meet the heavy-load operation task requirements in the middle-to-large sized casting production, and improvement on operation accuracy and efficiency is limited. Application of the existing casting robot is also limited to a case for assisting in completing a relatively simple casting operation task at a fixed station, and cannot adapt to the movable accuracy operation requirement in the complex operation environment of the casting production. For example, a serial pouring robot used in the production is simple in structure and low in cost, but cannot meet use in diversified places due to excessively few freedom degrees and the single application place. Casting robots generally applied are all obtained by remanufacturing common robots. Currently, for many small-to-middle sized casting manufacturers, when operations of core taking, core assembling, core setting, pouring and the like are carried out in the production process, the huge-crowd strategy is usually adopted, one worker carries out core taking, core setting, core assembling and melt pouring at one station, and the worker has to run back and forth, so it seems very busy and disordered and meanwhile, working efficiency is low. The operation for carrying the sand cores and the castings is mainly completed by manually simple assisting lifting equipment, and in few technical solutions in which the robot are adopted, mainly the serial robot at a fixed position is equipped with a pneumatic gripper to carry out operations, lack of a professional movable heavy-load casting robot. Particularly, in the pouring operation process of the middle-to-large sized casting, labor is still mainly adopted, with high labor intensity of the worker high physical output, and a low working efficiency. In the pouring process, molten iron or molten steel is transferred onto the production line by a casting ladle, and is aligned with a sprue gate, so that the molten iron or the molten steel in the casting ladle is poured into a pouring riser of a pouring workpiece. Currently, pouring the molten iron or the molten steel is performed by the following process: carrying by workers or lifting by a travelling crane the heavy casting ladle to receive the molten iron or the molten steel from a high-frequency furnace, then moving 150 to 200 kg molten iron or molten steel in the casting ladle to the pouring place, and slowly inclining the casting ladle by cooperation of two or more people so as to pour the molten iron or the molten steel in the casting ladle into the sprue gate of the workpiece. Such method has the following defects: (1) due to the load of the worker, the size (weight) of a casting part is limited, and when one casting needs to be casted in very short time, if two or more ladles of molten iron or molten steel are adopted, due to the low speed of the worker, the made casting is prone to casting defects such as the quality problems and the like; (2) labor intensity of the worker is high, the working environment is harsh, a temperature of the molten iron or the molten steel reaches about 1,500° C., a working environment temperature for the worker is above 40° C., and the worker is easy to feel tired due to high labor intensity; (3) the working environment is dangerous, the worker should be always careful of splashing of the molten iron or the molten steel, and there are hidden dangers for worker's personal safety; and (4) in the working process, a transport speed and a pouring speed are low, with a low working efficiency, and a low productivity, thereby increasing a manufacturing cost and delaying the manufacturing progress.

Aiming at the problems of the casting in the operations of core assembling, core setting, pouring and carrying, existing patents also provide some solutions. The Chinese Patent Publication No. 201610698460.5 discloses an automatic pouring robot which includes a power device, a transmission device, a scooping device, a detection device and the like and can control a rotating speed and angle of a scoop, but for this solution, only simple scooping and pouring can be carried out, a working space of the robot is small, and production efficiency is low. The Chinese Patent Application No. 200910015467.2 discloses an aluminum piston pouring robot, a main swing arm, an auxiliary swing arm, and a vertical swing arm and connecting bars of the pouring robot form a parallel four-bar mechanism, which can meet the follow-up pouring process requirements that an aluminum piston blank casting is tilted forward or backward, but for this solution, flexibility is poor, a time interval for actions is long, production efficiency is low, repeatability precision for a weight for scooped aluminum liquid and positioning accuracy for the scooped aluminum liquid are poor, and product quality is instable. The Chinese Patent Application No. 201610072679.4 discloses a pouring device controlled by a robot, the device is driven by adopting a bevel gear, a compressed air cooling pipeline and a fan continuously cool down the pouring device, but meanwhile, a cooling effect is also performed to pouring liquid, so that production quality is reduced. The Chinese Patent Application No. 201611165409.4 discloses a high-accuracy aluminum piston pouring robot which includes an ABB six-axis industrial robot and a pouring robot and has the characteristics of multiple freedom degrees, high system flexibility and the like, but this solution adopts a serial robot arm, the working space is small and the movement process is instable, so that pouring quality is influenced. The Chinese Patent Application No. 200710012538.4 discloses a novel parallel pouring robot which includes a base, a revolute joint, a rotary wheel, a machine body and a casting ladle, ensures accuracy for liquid taking by a volume method and drives a set of parallelogram four-bar mechanism by a motor to enable the casting ladle to swing in a certain range so as to implement positioning of the casting ladle, but accurate positioning cannot be ensured in other directions, and the working space of the robot is small. The Chinese Patent Application No. 201320665695.6 discloses a four-joint scooping or pouring robot, and the equipment is simple in structure and cannot carry out complex pouring work and is low in positioning accuracy and low structural bearing capacity in the pouring process. The Chinese Patent Application No. 201120359585.8 discloses a robot double-casting-ladle pouring arm which includes a pouring arm, a supporting frame, servo motors and a speed reducer, two motors respectively drive two casting ladles to carry out pouring by chain transmission systems, production efficiency is improved, but meanwhile, positioning accuracy becomes poor, and a spacing between two casting ladles is non-adjustable, so that the robot double-casting-ladle pouring arm is only suitable for a small-sized casting. The Chinese Patent Application No. 201510444411.4 discloses a movable ground rail pouring manipulator, a base is mounted below the pouring manipulator, and is moved on the ground rail by sliding wheels, but the working track is limited by the rails and flexibility is poor. The Chinese Patent Application No. 201621367895.3 discloses a design solution of a piston one-machine two-mode full-automatic casting machine which adopts a serial pouring robot at a fixed position and a simple part-taking hand to complete tasks of taking the aluminum liquid, pouring and taking the casting and is suitable for a light-load operation at a fixed position on a production line.

In the aspects of core taking, core assembling and core setting, the Chinese Patent Application No. 200920140832.8 discloses a casting core setting device including a sand box, a sand box positioning assembly and a serial manipulator for clamping a core and the like, the manipulator can only operate in a defined range, an actuator for clamping a sand core adopts a clip plate structure, and the casting core setting device can only meet the operation requirements of the single sand core. The Chinese Patent Application No. 201520331028.3 discloses a robot device for automatic core assembling which includes a sand core placement sliding table and a gripper working at a fixed position, a supporting seat, an adjusting eccentric wheel, a positioning wheel and a photoelectric detection switch are arranged on the sand core placement sliding table, a glue injection device and a detection device are arranged on the gripper, a plurality of glue guns are arranged on the glue injection device, the technical solution only simplifies structures of the glue injection device and the detection device and implements integration of the two functions, the whole device cannot move, the working range is limited, and the operation requirements of a special-shaped sand core cannot be met. The Chinese Patent Application No. 201610325766.6 discloses a base-type robot core setting and part taking mechanism which includes a pouring mechanical arm and a core setting and part taking mechanical arm, and although the requirement for the radius of the three-station core assembling operation can be met by an arranged three-station core assembling rotation platform and labor intensity of staffs is reduced, the operation range and objects are still limited by a fixed position of a robot and a simple end actuator. The Chinese Patent Application No. 201611053848.6 discloses a core taking and core assembling robot gripper which includes a control module, a gripper frame, a connecting flange, a clamping mechanism module on left of the gripper, a linear sliding block guide rail, a clamping mechanism module in the middle of the gripper, a pneumatic servo translation mechanism and a clamping mechanism module on the right of the gripper and can simultaneously clamp one, two or three sand cores on the left, in the middle and on the right, when each module independently performs a gripping action, the rotation of the sand core can be implemented by a pneumatic rotating module, but the core taking and core assembling robot gripper has the defects that in the gripping process, the sand core can only be clamped by a movable end clamping arm module, and when a relatively heavy sand core is gripped, not only there are few clamping points, but also the sand core needs to be moved, so that the sand core is easy to damage.

As the casting technology is improved, there are more and more requirements for production of middle-to-large sized castings and automation of operations of core taking, core assembling, core setting, pouring and carrying in the cast forming process. In the existing technical solutions, mostly the serial manipulator at a fixed station is adopted to carry out operations, not only the operation range is small and the movement is limited, but also load capacity is low, and the requirements for the operations of core taking, core assembling, core setting, pouring and carrying of the middle-to-large sized castings cannot be met.

SUMMARY

The present invention aims to provide an omnidirectional wheel type movable heavy-load casting robot, which can be used for operations of core taking, core assembling, core setting, pouring, carrying and the like of a middle-to-large sized casting in its casting process, improves operation efficiency, casting quality and safety of casting production, reduces labor intensity and production cost and can overcome the defects in the prior art.

The technical problems to be solved by the present invention are implemented by adopting the following technical solutions.

A series-parallel movable heavy-load casting robot includes a four-driving-wheel type moving platform, a rotating device, an upright assembly, a lifting drive device, a parallel working arm, an end actuator and a binocular vision system, wherein the four-driving-wheel type moving platform is a bearing and moving platform of the present invention and includes a platform frame, front driving wheels, rear driving wheels, rear hydraulic supporting legs, adjustable hydraulic supporting legs, a controller, a monitor and a hydraulic pump station. Navigation sensors are arranged at the bottoms of both front and rear ends of the platform frame, the navigation sensors adopt magnetic navigation sensors or laser scanners or infrared transmitters or ultrasonic transmitters, a digital dual-axis level gauge is also arranged in the platform frame, and measurement accuracy of the digital dual-axis level gauge is not lower than 0.01 degree; distance measure sensors are arranged at the middle portions of the front side surface, the rear side surface, the left side surface and the right side surface of the platform frame, and the distance measure sensors adopt laser distance measure sensors or ultrasonic distance measure sensors; two front driving wheels and two rear driving wheels are respectively mounted at the front end of the platform frame and at the rear end of the platform frame, for driving the four-driving-wheel type moving platform to walk; and two rear hydraulic supporting legs are symmetrically mounted on two corners of the rear portion of the platform frame, the adjustable hydraulic supporting legs are mounted on both sides of the front portion of the platform frame, and the two rear hydraulic supporting legs and the adjustable hydraulic supporting legs are used for the casting robot to carry out stationary point supporting in the operation process so as to ensure that the four-driving-wheel type moving platform implements in situ positioning and stable supporting in the operation process. The controller is arranged at the middle portion of the rear end of the platform frame and is used for receiving sensing information acquired by each sensor mounted on the four-driving-wheel type moving platform and industrial cameras in the binocular vision system mounted at the top of the upright assembly and controlling the four-driving-wheel type moving platform, the rotating device, the lifting drive device, the parallel working arm and the end actuator to execute corresponding actions or task instructions. The monitor is fixedly mounted at the top of the controller, and is used for displaying position and distance information acquired by the navigation sensors and the distance measure sensors, attitude parameters of the platform frame measured by the digital dual-axis level gauge, pose parameters of the end actuator, image information acquired by the binocular vision system and working state parameters of the series-parallel movable heavy-load casting robot. The hydraulic pump station is fixedly mounted on the left side of the rear end of the platform frame, and is used for providing pressure oil for the rear hydraulic supporting legs, the adjustable hydraulic supporting legs or servo hydraulic motors. The rotating device is located at the front end of the four-driving-wheel type moving platform, is fixedly mounted on the platform frame by a screw, and is used for driving the lifting drive device, the parallel working arm and the end actuator to carry out rotating motion. The upright assembly is positioned right above the rotating device, and the bottom of the upright assembly is fixedly mounted at the top of the rotating device; and the lifting drive device is fixedly mounted on the upright assembly, the front end of the lifting drive device is connected with the rear end of the parallel working arm by a hinge, and the lifting drive device is used for driving the parallel working arm and the end actuator to carry out lifting motion. The parallel working arm is a four-degree-of-freedom parallel mechanism which is of a 2RPU-2RRPR structure, and is used for supporting and driving the end actuator to implement four-degree-of-freedom motion of front-and-back telescoping movement, left-and-right translation, rotation around a horizontal axis and rotation around a vertical axis and attitude adjustment. The end actuator is mounted at the front end of the parallel working arm, and the rear end of the parallel working arm is mounted on the upright assembly and can slide up and down along the upright assembly; the binocular vision system includes industrial cameras, an image acquisition card and an industrial computer, and is used for acquiring, analyzing and processing the image information acquired by the industrial cameras on work site and identifying and judging geometrical shapes and attitudes of a sand core assembly, a casting, a sand box and a sprue; and two industrial cameras are provided and are both provided with light-emitting diode (LED) illumination light sources, the image acquisition card is integrally mounted in the monitor, the industrial computer is integrally mounted in the controller, the industrial cameras are connected with the image acquisition card by data lines, and the image acquisition card is connected with the industrial computer by a data line.

Both the front driving wheels and the rear driving wheels adopt Mecanum omnidirectional wheels; and the end actuator particularly can adopt a casting ladle or a two-claw clamping plate type pneumatic gripper or a three-finger type synchronous pneumatic gripper or a multi-finger asynchronous type pneumatic gripper, a range of pair numbers of clamping gripper fingers is 4 to 12, and each pair of clamping gripper fingers are independently connected and controlled by one bidirectional-acting finger cylinder so as to implement independent loosening and clamping of each pair of clamping gripper fingers and implement effective contact-fit gripping for a special-shaped sand core or casting.

In order to improve balance of the four-driving-wheel type moving platform of the present invention in the stationary point parking state and the anti-overturning ability of the inventive platform in the heavy-load operation process, driving power of the rear hydraulic supporting leg and the vertical supporting leg adopts an electro-hydraulic servo oil cylinder or an electro-hydraulic stepping hydraulic cylinder; and the adjustable hydraulic supporting legs not only can swing left and right, but also can extend or retract. The adjustable hydraulic supporting leg includes a supporting leg box, a telescopic arm, a vertical supporting leg, a telescopic cylinder for the supporting leg, and a swing angle adjusting cylinder. Herein, the supporting leg box is of a hollow structure, the rear end of the supporting leg box is connected with the platform frame by a hinge, and an angle sensor is arranged at the rear end of the supporting leg box for detecting a left and right swing angles of the supporting leg box; the rear end of the telescopic arm is sleeved into the supporting leg box and can slide in the supporting leg box; the telescopic cylinder for the supporting leg is mounted in the supporting leg box and is used for driving the telescopic arm to slide along the supporting leg box so as to achieve a telescopic function of the adjustable hydraulic supporting leg, and both front and rear ends of the telescopic cylinder for the supporting leg are respectively connected with the telescopic arm and the supporting leg box by hinges; the top of the vertical supporting leg is fixedly mounted at the tail end of the front portion of the telescopic arm; and both ends of the swing angle adjusting cylinder are respectively connected with the platform frame and the supporting leg box by hinges, and the telescopic cylinder for the supporting leg and the swing angle adjusting cylinder adopt double-acting hydraulic cylinders and are used for driving the supporting leg box, the telescopic arm and the vertical supporting leg to swing left and right around the hinge axis at the rear end of the supporting leg box. A displacement sensor is also arranged on the telescopic cylinder for the supporting leg and is used for detecting a displacement of the telescopic arm relative to the supporting leg box. The rear hydraulic supporting leg and the adjustable hydraulic supporting leg can carry out automatic adjustment according to a static inclination angle of the four-driving-wheel type moving platform relative to a horizontal plane, which is measured by the digital dual-axis level gauge in the platform frame, so as to achieve a self-balancing function of the four-driving-wheel type moving platform in the stationary point supporting state.

The rotating device includes a rotating base, a rotating body, a rotating motor, a rotating gear, an inner gear ring and a rotating top cover, wherein the rotating base is fixedly mounted on the platform frame by a screw; the rotating body is sleeved into the rotating base and is connected with the rotating base by a radial bearing and two thrust bearings, the radial bearing adopts a radial cylindrical roller bearing, and the thrust bearings are cylindrical roller thrust bearings; the rotating motor is fixedly mounted below the rotating base and is used for driving the rotating body and the rotating top cover to carry out rotating motion, and the rotating gear is mounted on an output shaft of the rotating motor; the inner gear ring is fixedly mounted in the rotating body by a screw, and is kept being internally meshed with the rotating gear; the rotating top cover is fixedly mounted at the top of the rotating body and is connected with the rotating body by a screw, and an angle sensor is also arranged at the center of the bottom of the rotating top cover and is used for measuring rotating angles of the rotating body and the rotating top cover relative to the rotating base; and the rotating motor adopts a servo gear motor or a servo hydraulic motor.

The upright assembly includes an upright base, uprights and a top beam, wherein the upright base is positioned above the rotating top cover and is fixedly connected with the rotating top cover by a screw, and two uprights are provided, are bilaterally symmetrically arranged between the upright base and the top beam and are fixedly connected with the upright base and the top beam; a long-displacement sensor is arranged on the inner side surface of one upright, and is used for measuring a displacement parameter when the parallel working arm slides on the uprights; front linear guide rails are fixedly mounted on the front side surfaces of both the uprights, rear linear guide rails are fixedly mounted on the rear side surfaces of both the uprights, and the rear linear guide rails adopt Ω-shaped linear guide rails; and further, the long-displacement sensor can adopt a linear magnetic induction sensor or a linear grating sensor or a linear inductosyn. The two industrial cameras are fixedly mounted on both sides of the front end of the top beam, and are connected with the top beam by a two-degree-of-freedom cradle head.

The lifting drive device includes a lifting motor, driving sprockets, front guide sprockets, rear guide sprockets, chains and counter weight blocks, wherein the numbers of the driving sprockets, the front guide sprockets, the rear guide sprockets and the chains are all two, and the driving sprockets, the front guide sprockets, the rear guide sprockets and the chains are bilaterally symmetrically arranged on the upright assembly; the lifting motor is fixedly mounted at the middle position of the top of the top beam, and is used for providing power for rotation of the driving sprockets so as to drive the parallel working arm to carry out the lifting motion; two driving sprockets are positioned at both sides of the middle portion of the top beam and fixedly mounted on an output shaft of the lifting motor, two front guide sprockets are fixedly mounted at the front side surface of the top beam, and two rear guide sprockets are fixedly mounted at the rear side surfaces of the top beam; the front ends of the chains are connected with the top of the rear end of the parallel working arm by hinges, the rear ends of the chains are connected with the counter weight blocks by hinges, and the chains are simultaneously kept being meshed with the driving sprockets, the front guide sprockets and the rear guide sprockets; and the counter weight blocks are positioned at the rear sides of the uprights, and are used for balancing weights of the parallel working arm and the end actuator, two rear sliding blocks symmetrically laid out are arranged at the front ends of the counter weight blocks and are connected with the rear linear guide rails on the uprights by sliding pairs, and both the left and right counter weight blocks are connected by a U-shaped connecting rod. The counter weight blocks adopt a split structure, the weight of counter weight blocks can be adjusted according to a load size of the end actuator, meanwhile, the number of the counter weight blocks can be increased along the front-and-back direction, and the counter weight blocks arranged one behind the other are connected by screws. The lifting motor adopts a servo gear motor or a servo hydraulic motor.

The parallel working arm includes a working arm mounting seat, a first branch chain, a second branch chain, a third branch chain and a fourth branch chain, wherein the working arm mounting seat is positioned at the front sides of the uprights, and four rear sliding blocks symmetrically laid out are arranged on the rear end face of the working arm mounting seat and are connected with the front linear guide rails of the uprights by sliding pairs; the first branch chain and the third branch chain are totally the same in structure, have mechanism topological structures of RPU structures, and are bilaterally symmetrically arranged on the working arm mounting seat; and the second branch chain and the fourth branch chain are totally the same in structure, have mechanism topological structures of RRPR structures, and are bilaterally symmetrically arranged on the working arm mounting seat. From the view of the mechanism theory, the parallel working arm and the end actuator constitute a parallel mechanism with four freedom degrees of motion in space together, which include two translational freedom degrees and two rotational freedom degrees. The working arm mounting seat namely is a fixed platform of the parallel mechanism formed by the parallel working arm and the end actuator, and the end actuator namely is a movable platform of the parallel mechanism formed by the parallel working arm and the end actuator. The parallel working arm, the end actuator, the upright assembly and the rotating device constitute a series-parallel mechanism with five freedom degrees in space together, which include three translational freedom degrees and two rotational freedom degrees, wherein rotation around the vertical axis is a redundant freedom degree.

The first branch chain includes a first front universal joint, a first telescopic set and a first rear hinge, wherein the inner side end of the first rear hinge is fixedly connected with the working arm mounting seat, the rear end of the first telescopic set is connected with the outer side end of the first rear hinge by a sliding pair, the front end of the first telescopic set is fixedly connected with the rear end of the first front universal joint, and the front end of the first front universal joint is fixedly connected with the end actuator. The second branch chain includes a first front hinge, a second telescopic set, a second rear hinge and a first vertical hinge, wherein the front end of the first front hinge is fixedly connected with the end actuator, the front end of the second telescopic set is fixedly connected with the rear end of the first front hinge, the rear end of the second telescopic set is connected with the upper end of the second rear hinge by a sliding pair, the lower end of the first vertical hinge is fixedly connected with the upper end of the second rear hinge, and the top of the first vertical hinge is fixedly mounted on the working arm mounting seat. The fourth branch chain includes a second front hinge, a fourth telescopic set, a fourth rear hinge and a second vertical hinge, wherein the front end of the second front hinge is fixedly connected with the end actuator, the front end of the fourth telescopic set is fixedly connected with the rear end of the second front hinge, the rear end of the fourth telescopic set is connected with the lower end of the fourth rear hinge by a sliding pair, the upper end of the second vertical hinge is fixedly connected with the lower end of the fourth rear hinge, the bottom of the second vertical hinge is fixedly mounted on the working arm mounting seat, and the lower end of the first vertical hinge is fixedly connected with the upper end of the second vertical hinge. The axis of the first rear hinge is in parallel to one axis of a cross shaft of the first front universal joint, and the horizontal axis of the cross shaft of the first front universal joint is kept coaxial with the horizontal axis of a cross shaft of the second front universal joint of the third branch chain; the axis of the first front hinge is in parallel to the axis of the second rear hinge, the axis of the first front hinge is perpendicular to the axis of the first vertical hinge, the first vertical hinge and the second vertical hinge are kept coaxial, the axis of the first front hinge is in parallel to the axis of the second front hinge, and the axis of the second front hinge is in parallel to the axis of the fourth rear hinge; and axes of the first rear hinge, the first vertical hinge, the second vertical hinge and a third rear hinge on the third branch chain are all kept in parallel to each other so as to ensure that the parallel mechanism formed by the parallel working arm and the end actuator together has definite four freedom degrees of motion in space, which include two translational freedom degrees and two rotational freedom degrees.

The first telescopic set includes a first telescopic rack, a first threaded rod, a first sliding block and a first driving motor, wherein the front end of the first telescopic rack is fixedly connected with the rear end of the first front universal joint; both ends of the first threaded rod are mounted on the first telescopic rack by bearing seats, and the first driving motor is fixedly mounted at the rear end of the first telescopic rack, is connected with the rear end of the first threaded rod by a coupler and is used for driving the first sliding block to carry out extension or retraction along the first threaded rod; the first sliding block is mounted in the inner sides of the first telescopic rack by two parallel linear guide rails, and is connected with the first threaded rod by a screw thread; the first sliding block is connected with the working arm mounting seat by the first rear hinge; and the second telescopic set, the third telescopic set and the fourth telescopic set are totally the same as the first telescopic set in structure.

In use, firstly, proper end actuators are selected according to tasks of casting operations, when a pouring task is executed, a casting ladle is selected as the end actuator, and when tasks of core taking, core assembling, core setting and carrying are executed and particularly when an operation object is a special-shaped sand core or casting, the multi-finger asynchronous type pneumatic gripper can be selected as the end actuator. Then, the front driving wheels and the rear driving wheels are started up according to operation requirements to enable the four-driving-wheel type moving platform to walk to a designated operation position in a workshop, then the rotating device and the lifting drive device are respectively adjusted according to operation attitude and height requirements, the end actuator is adjusted to the proper operation attitude and operation height by adjusting the inventive parallel working arm, and attitude adjustment of the parallel working arm is implemented by driving the sliding blocks on each branch chain to move forwards or backwards along the threaded rod. When a stationary point operation is executed and particularly when pouring and loading and transporting a casting with a relatively large weight, the front driving wheels and the rear driving wheels are possible to slip or be unstable so as to influence operation accuracy of the casting robot, and thus, the swing angle of the adjustable hydraulic supporting leg needs to be adjusted, and meanwhile, the rear hydraulic supporting legs and the vertical supporting legs of the adjustable hydraulic supporting legs extend so as to implement stationary point stable supporting of the four-driving-wheel type moving platform. The position and distance information acquired by the navigation sensors and the distance measure sensors, the image information acquired by the binocular vision system, vertical displacement and rotation angle information of the end actuator, real-time working state parameters of the casting robot and the like are all visually displayed on the monitor, and analyzing information and processing tasks for the attitude adjustment and operation tasks of the casting robot or the like are completed by the controller.

The present invention has the following beneficial effects, Compared to the prior art, the four-driving-wheel type moving platform of the present invention is driven by adopting independent four-omnidirectional-wheel to implement long-distance flexible stable walking; the rear hydraulic supporting legs and the adjustable hydraulic supporting legs can be automatically adjusted according to the static inclination angle of the four-driving-wheel type moving platform relative to the horizontal plane measured by the digital dual-axis level gauge in the platform frame, so as to implement stationary point self-balancing supporting, thereby not only ensuring long-distance stable walking of the casting robot under the heavy-load condition, but also improving supporting stability upon operations; except that the four-driving-wheel type moving platform can move and walk in all directions, the robot body also has five freedom degrees of motion, which include three movement freedom degrees of lifting, front-and-back extension and retraction and left-and-right translation and two rotational freedom degrees of rotation respectively around the vertical axis and the horizontal axis, the rotating device and the lifting drive device can respectively implement whole-cycle rotation and lifting adjustment, and the four-degree-of-freedom parallel working arm can adjust attitude adjustment for the end actuator, so that the working space of the robot is obviously enlarged, and motion flexibility of the casting robot is improved; and the end actuator of the series-parallel movable heavy-load casting robot can also be replaced with the casting ladle or the two-claw clamping plate type pneumatic gripper or the three-finger type synchronous pneumatic gripper or the multi-finger asynchronous type pneumatic gripper according to working requirements so as to meet the requirements for different operations of core taking, core assembling, core setting, pouring, carrying and the like for the middle-to-large sized casting, improving efficiency, quality and safety of the operations of core assembling, core setting, pouring and carrying in the casting production and reducing labor intensity of an operator and production cost. Particularly, adopting the multi-finger asynchronous type pneumatic gripper can meet the operation requirements for effective contact-fit gripping for the special-shaped sand core and casting, can avoid damage to the sand core or the casting in the core assembling and core setting processes and improves stability, safety and adaptability of the operations, by fusion of multi-sensor information from the navigation sensors, the distance measure sensors and the digital dual-axis level gauge which are mounted on the platform frame, the angle sensor on the rotating device, the long-displacement sensor on the lifting device and the industrial cameras, the following contents can be automatically completed: self-balancing control and position judgment of the casting robot, and casting operation tasks such as identification of the sand core and the casting, identification of the sand box and the sprue, gripping, placement and pouring of the sand core assembly and the casting, with a high automation degree and working efficiency, and low labor intensity; and the present invention further has the advantages of compact structure, small space occupied by equipment, low production cost, high safety, high adaptability, convenience for replacing the end actuator, simplicity and convenience for operation and maintenance and the like, and can overcome the defects in the prior art.

DETAILED DESCRIPTION OF THE EMBODIMENTS

Figure 1:
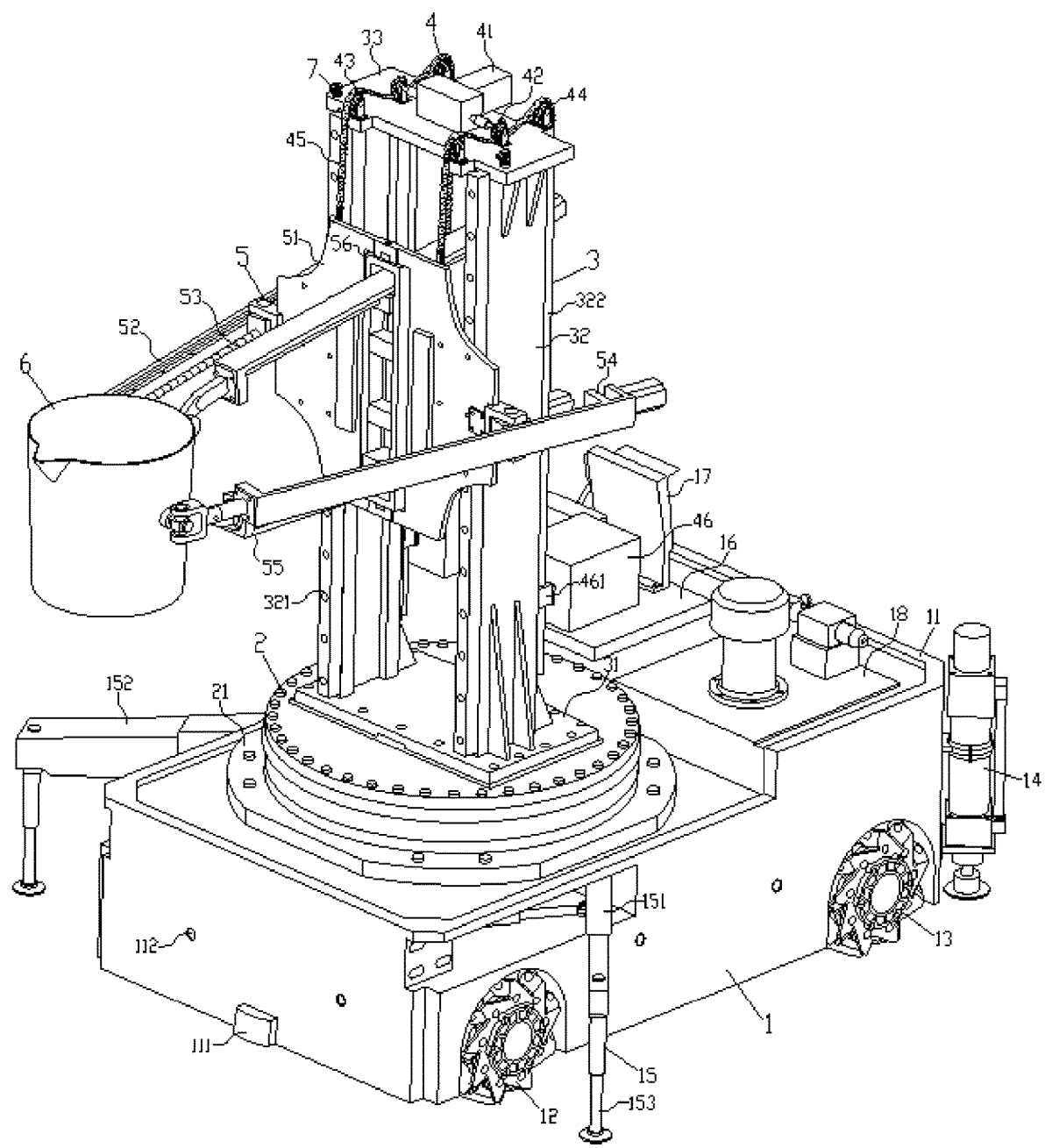
FIG. 1 is an overall structural schematic diagram of the present invention.

In order to easily understand the technical means, creative characteristics and fulfilled objects and effects achieved by the present invention, the present invention will be further illustrated below in connection with specific embodiments and the drawings.

Specific Embodiment I

As shown in FIG. 1, FIG. 2, FIG. 3, FIG. 4, FIG. 7 and FIG. 11, a series-parallel movable heavy-load casting robot includes a four-driving-wheel type moving platform 1, a rotating device 2, an upright assembly 3, a lifting drive device 4, a parallel working arm 5, an end actuator 6 and a binocular vision system 7, wherein the four-driving-wheel type moving platform 1 is a bearing and moving platform of the present invention and includes a platform frame 11, front driving wheels 12, rear driving wheels 13, rear hydraulic supporting legs 14, adjustable hydraulic supporting legs 15, a controller 16, a monitor 17 and a hydraulic pump station 18. Navigation sensors 111 are arranged at the bottoms of both front and rear ends of the platform frame 11, the navigation sensors 111 adopt magnetic navigation sensors or laser scanners or infrared transmitters or ultrasonic transmitters, a digital dual-axis level gauge is also arranged in the platform frame 11, and measurement accuracy of the digital dual-axis level gauge is not lower than 0.01 degree; distance measure sensors 112 are arranged at the middle portions of the front side surface, the rear side surface, the left side surface and the right side surface of the platform frame 11, and the distance measure sensors adopt laser distance measure sensors or ultrasonic distance measure sensors; two front driving wheels 12 are mounted at the front end of the platform frame 11, two rear driving wheels 13 are mounted at the rear end of the platform frame 11, and the two front driving wheels and the two rear driving wheels are used for driving the four-driving-wheel type moving platform 1 o walk; and two rear hydraulic supporting legs 14 are symmetrically mounted on two corners of the rear portion of the platform frame 11, the adjustable hydraulic supporting legs 15 are mounted on both sides of the front portion of the platform frame 11, and the two rear hydraulic supporting legs and the adjustable hydraulic supporting legs are used for the casting robot to carry out stationary point supporting in the operation process so as to ensure that the four-driving-wheel type moving platform 1 implements in situ positioning and stable supporting in the operation process. The controller 16 is arranged at the middle portion of the rear end of the platform frame 11 and is used for receiving sensing information acquired by each sensor mounted on the four-driving-wheel type moving platform 1 and industrial cameras in the binocular vision system 7 mounted at the top of the upright assembly 3 and controlling the four-driving-wheel type moving platform 1, the rotating device 2, the lifting drive device 4, the parallel working arm 5 and the end actuator 6 to execute corresponding actions or task instructions. The monitor 17 is fixedly mounted at the top of the controller 16, and is used for displaying position and distance information acquired by the navigation sensors 111 and the distance measure sensors 112, attitude parameters of the platform frame 11 measured by the digital dual-axis level gauge, pose parameters of the end actuator 6, image information acquired by the binocular vision system 7 and working state parameters of the series-parallel movable heavy-load casting robot. The hydraulic pump station 18 is fixedly mounted at the left side of the rear end of the platform frame 11, and is used for providing pressure oil for the rear hydraulic supporting legs 14, the adjustable hydraulic supporting legs 15 or servo hydraulic motors; and the rotating device 2 is positioned at the front end of the four-driving-wheel type moving platform 1, is fixedly mounted on the platform frame 11 by a screw, and is used for driving the lifting drive device 4, the parallel working arm 5 and the end actuator 6 to carry out rotating motion. The upright assembly 3 is positioned right above the rotating device 2, and the bottom of the upright assembly 3 is fixedly mounted at the top of the rotating device 1; and the lifting drive device 4 is fixedly mounted on the upright assembly 3, the front end of the lifting drive device 4 is connected with the rear end of the parallel working arm 5 by a hinge, and the lifting drive device 4 is used for driving the parallel working arm 5 and the end actuator 6 to carry out lifting motion. The parallel working arm 5 is a four-degree-of-freedom parallel mechanism which is of a 2RPU-2RRPR structure, and is used for supporting and driving the end actuator 6 to implement four-degree-of-freedom motion including front-and-back telescoping movement, left-and-right translation, rotation around a horizontal axis and rotation around a vertical axis and attitude adjustment. The end actuator 6 is mounted at the front end of the parallel working arm 5, and the rear end of the parallel working arm 5 is mounted on the upright assembly 3 and can slide up and down along the upright assembly 3; the binocular vision system 7 includes industrial cameras, an image acquisition card and an industrial computer, and is used for acquiring, analyzing and processing the image information acquired by the industrial cameras on work site and identifying and judging geometrical shapes and attitudes of a sand core assembly, a casting, a sand box and a sprue; and two industrial cameras are provided and are both provided with LED illumination light sources, the image acquisition card is integrally mounted in the monitor 17, the industrial computer is integrally mounted in the controller 16, the industrial cameras are connected with the image acquisition card by data lines, and the image acquisition card is connected with the industrial computer by a data line.

Figure 3:
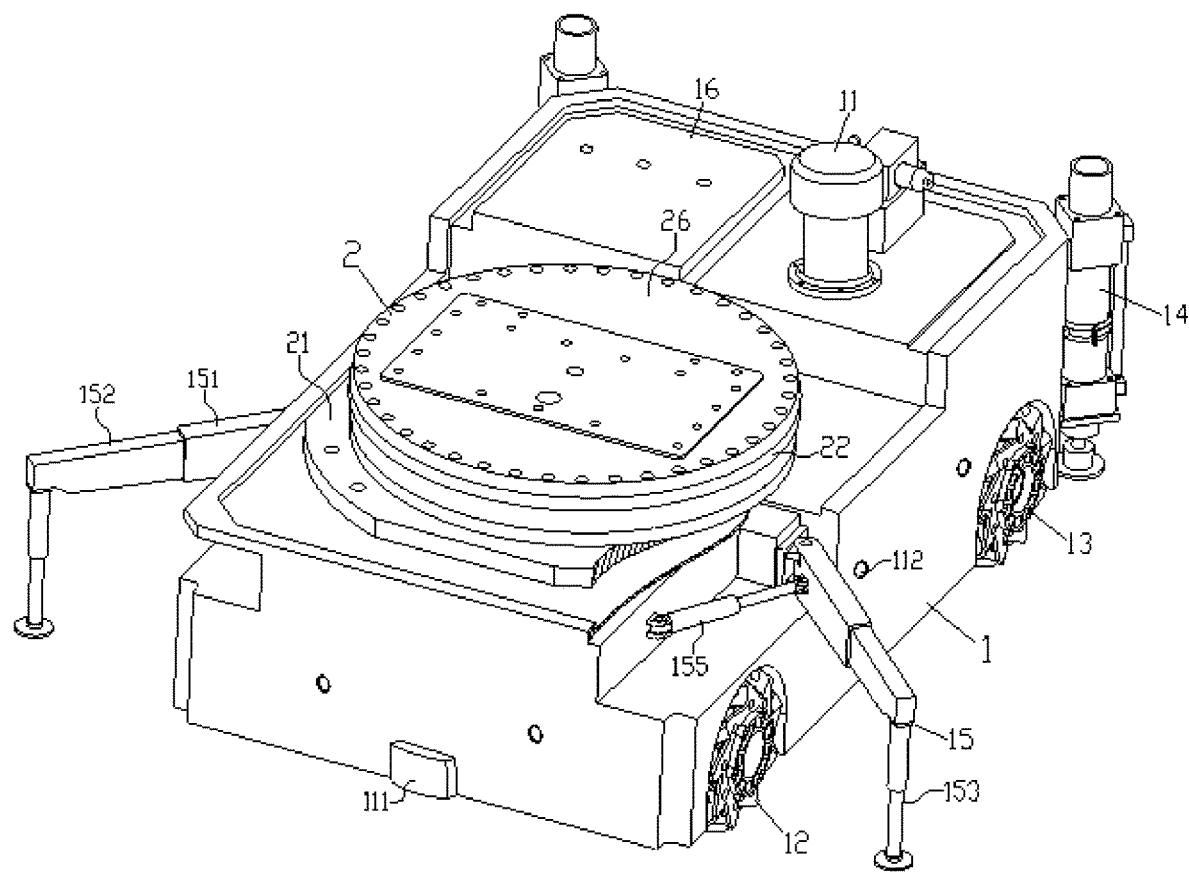
FIG. 3 is a structural schematic diagram of a four-driving-wheel type moving platform of the present invention.
Figure 11:
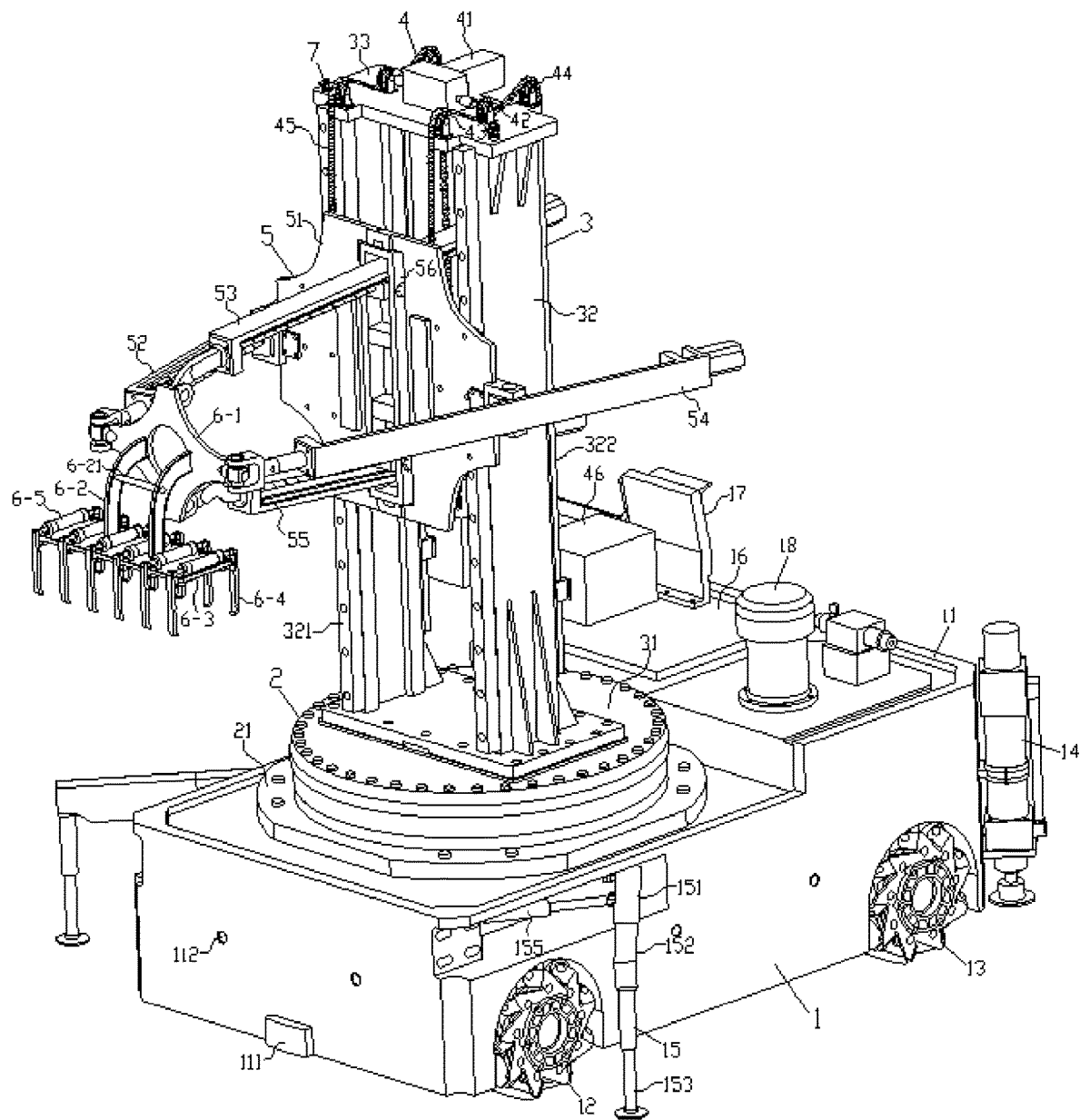
FIG. 11 is an overall structural schematic diagram of the present invention when an end actuator is replaced with the multi-finger asynchronous type pneumatic gripper.

As shown in FIG. 1, FIG. 3 and FIG. 11, both the front driving wheels 12 and the rear driving wheels 13 adopt Mecanum omnidirectional wheels; and the end actuator 6 adopts a casting ladle for achieving a pouring operation function in the casting production.

As shown in FIG. 1, FIG. 3, FIG. 4 and FIG. 11, the rotating device 2 includes a rotating base 21, a rotating body 22, a rotating motor 23, a rotating gear 24, an inner gear ring 25 and a rotating top cover 26, wherein the rotating base 21 is fixedly mounted on the platform frame 11 by a screw; the rotating body 22 is sleeved into the rotating base 21 and is connected with the rotating base 21 by a radial bearing and two thrust bearings, the radial bearing adopts a radial cylindrical roller bearing, and the thrust bearings are cylindrical roller thrust bearings; the rotating motor 23 is fixedly mounted below the rotating base 21 and is used for driving the rotating body 22 and the rotating top cover 26 to carry out rotating motion, and the rotating gear 24 is mounted on an output shaft of the rotating motor 23; the inner gear ring 25 is fixedly mounted in the rotating body 22 by a screw, and is kept being internally meshed with the rotating gear 24; and the rotating top cover 26 is fixedly mounted at the top of the rotating body 22 and is connected with the rotating body 22 by a screw, and an angle sensor is also arranged at the center of the bottom of the rotating top cover 26 and is used for measuring rotating angles of the rotating body 22 and the rotating top cover 26 relative to the rotating base 21.

As shown in FIG. 1, FIG. 2, FIG. 5 and FIG. 11, the upright assembly 3 includes an upright base 31, uprights 32 and a top beam 33, wherein the upright base 31 is positioned above the rotating top cover 26 and is fixedly connected with the rotating top cover 26 by a screw, and two uprights 32 are provided, are bilaterally symmetrically arranged between the upright base 31 and the top beam 33 and are both fixedly connected with the upright base 31 and the top beam 33; a long-displacement sensor is arranged at the inner side surface of one upright 32, and is used for measuring a displacement parameter when the parallel working arm 5 slides on the uprights; front linear guide rails 321 are fixedly mounted on the front side surfaces of both the uprights 32, rear linear guide rails 322 are fixedly mounted on the rear side surfaces of both the uprights 32, and the rear linear guide rails 322 adopt a-shaped linear guide rails; and further, the long-displacement sensor can adopt a linear magnetic induction sensor or a linear grating sensor or a linear inductosyn. The two industrial cameras are fixedly mounted on both sides of the front end of the top beam 33, and are connected with the top beam 33 by a two-degree-of-freedom cradle head.

As shown in FIG. 1, FIG. 2, FIG. 5 and FIG. 11, the lifting drive device 4 includes a lifting motor 41, driving sprockets 42, front guide sprockets 43, rear guide sprockets 44, chains 45 and counter weight blocks 46, wherein the numbers of the driving sprockets 42, the front guide sprockets 43, the rear guide sprockets 44 and the chains 45 are all two, and the driving sprockets 42, the front guide sprockets 43, the rear guide sprockets 44 and the chains 45 are bilaterally symmetrically arranged on the upright assembly 3; the lifting motor 41 is fixedly mounted at the middle position of the top of the top beam 33, and is used for providing power for rotation of the driving sprockets 42 so as to drive the parallel working arm 5 to carry out the lifting motion; two driving sprockets 42 are positioned on both sides of the middle portion of the top beam 33 and fixedly mounted on an output shaft of the lifting motor 41, two front guide sprockets 43 are fixedly mounted on the front side surface of the top beam 33, and two rear guide sprockets 44 are fixedly mounted on the rear side surfaces of the top beam 33; the front ends of the chains 45 are connected with the top of the rear end of the parallel working arm 5 by hinges, the rear ends of the chains 45 are connected with the counter weight blocks 46 by hinges, and the chains 45 are simultaneously kept being meshed with the driving sprockets 42, the front guide sprockets 43 and the rear guide sprockets 44; and the counter weight blocks 46 are positioned on the rear sides of the uprights 32, and are used for balancing weights of the parallel working arm 5 and the end actuator 6, two rear sliding blocks 461 symmetrically laid out are arranged at the front ends of the counter weight blocks 46 and are connected with the rear linear guide rails 322 on the uprights 32 by sliding pairs, and both the left and right counter weight blocks 46 are connected by a U-shaped connecting rod 462. The counter weight blocks 46 adopt a split structure, the weight of counter weight blocks can be adjusted according to a load size of the end actuator 6, meanwhile, the number of the counter weight blocks 46 can be increased along the front-and-back direction, and the counter weight blocks 46 arranged one behind the other are connected by screws.

As shown in FIG. 1, FIG. 2, FIG. 5, FIG. 7, FIG. 8, FIG. 9 and FIG. 11, the parallel working arm 5 includes a working arm mounting seat 51, a first branch chain 52, a second branch chain 53, a third branch chain 54 and a fourth branch chain 55, wherein the working arm mounting seat 51 is positioned at the front sides of the uprights 32, and four rear sliding blocks 511 symmetrically laid out are arranged on the rear end face of the working arm mounting seat 51 and are connected with the front linear guide rails 321 of the uprights 32 by sliding pairs; the first branch chain 52 and the third branch chain 54 are totally the same in structure, mechanism topological structures of both the first branch chain 52 and the third branch chain 54 are RPU structures, and the first branch chain 52 and the third branch chain 54 are bilaterally symmetrically arranged on the working arm mounting seat 51; and the second branch chain 53 and the fourth branch chain 55 are totally the same in structure, mechanism topological structures of both the second branch chain 53 and the fourth branch chain 55 are RRPR structures, and the second branch chain 53 and the fourth branch chain 55 are bilaterally symmetrically arranged on the working arm mounting seat 51. From the view of the mechanism theory, the parallel working arm 5 and the end actuator 6 constitute a parallel mechanism with four freedom degrees of motion in space together, which include two translational freedom degrees and two rotational freedom degrees. The working arm mounting seat 51 namely is a fixed platform of the parallel mechanism formed by the parallel working arm 5 and the end actuator 6, and the end actuator 6 namely is a movable platform of the parallel mechanism formed by the parallel working arm 5 and the end actuator 6. The parallel working arm 5, the end actuator 6, the upright assembly 3 and the rotating device 2 constitute a series-parallel mechanism with five freedom degrees in space together, which include three translational freedom degrees and two rotational freedom degrees, wherein rotation around the vertical axis is a redundant freedom degree.

Specific Embodiment II

As shown in FIG. 1, FIG. 7, FIG. 8, FIG. 9 and FIG. 11, the first branch chain 52 includes a first front universal joint 521, a first telescopic set 522 and a first rear hinge 523, wherein the inner side end of the first rear hinge 523 is fixedly connected with the working arm mounting seat 51, the rear end of the first telescopic set 522 is connected with the outer side end of the first rear hinge 523 by a sliding pair, the front end of the first telescopic set 522 is fixedly connected with the rear end of the first front universal joint 521, and the front end of the first front universal joint 521 is fixedly connected with the end actuator 6. The second branch chain 53 includes a first front hinge 531, a second telescopic set 532, a second rear hinge 533 and a first vertical hinge 534, wherein the front end of the first front hinge 531 is fixedly connected with the end actuator 6, the front end of the second telescopic set 532 is fixedly connected with the rear end of the first front hinge 531, the rear end of the second telescopic set 532 is connected with the upper end of the second rear hinge 533 by a sliding pair, the lower end of the first vertical hinge 534 is fixedly connected with the upper end of the second rear hinge 533, and the top of the first vertical hinge 534 is fixedly mounted on the working arm mounting seat 51. The fourth branch chain 55 includes a second front hinge 551, a fourth telescopic set 552, a fourth rear hinge 553 and a second vertical hinge 554, wherein the front end of the second front hinge 551 is fixedly connected with the end actuator 6, the front end of the fourth telescopic set 552 is fixedly connected with the rear end of the second front hinge 551, the rear end of the fourth telescopic set 552 is connected with the lower end of the fourth rear hinge 553 by a sliding pair, the upper end of the second vertical hinge 554 is fixedly connected with the upper end of the fourth rear hinge 553, the bottom of the second vertical hinge 554 is fixedly mounted on the working arm mounting seat 51, and the lower end of the first vertical hinge 534 is fixedly connected with the upper end of the second vertical hinge 554, i.e., a hinge frame 56 is shared. The axis of the first rear hinge 523 is in parallel to one axis of a cross shaft of the first front universal joint 521, and the horizontal axis of the cross shaft of the first front universal joint 521 is kept coaxial with the horizontal axis of a cross shaft of the second front universal joint 541 of the third branch chain 54; the axis of the first front hinge 531 is in parallel to the axis of the second rear hinge 533, the axis of the first front hinge 531 is perpendicular to the axis of the first vertical hinge 534, the first vertical hinge 534 and the second vertical hinge 554 are kept coaxial, the axis of the first front hinge 531 is in parallel to the axis of the second front hinge 551, and the axis of the second front hinge 551 is in parallel to the axis of the fourth rear hinge 553; and axes of the first rear hinge 523, the first vertical hinge 534, the second vertical hinge 554 and a third rear hinge 543 on the third branch chain 54 are all kept in parallel to each other so as to ensure that the parallel mechanism formed by the parallel working arm 5 and the end actuator 6 together has definite four freedom degrees of motion in space, which include two translational freedom degrees and two rotational freedom degrees.

As shown in FIG. 1, FIG. 7, FIG. 8, FIG. 9 and FIG. 11, the first telescopic set 522 includes a first telescopic rack 5221, a first threaded rod 5222, a first sliding block 5223 and a first driving motor 5224, wherein the front end of the first telescopic rack 5221 is fixedly connected with the rear end of the first front universal joint 521; both ends of the first threaded rod 5222 are mounted on the first telescopic rack 5221 by bearing seats, and the first driving motor 5224 is fixedly mounted at the rear end of the first telescopic rack 5221, is connected with the rear end of the first threaded rod 5222 by a coupler and is used for driving the first sliding block 5223 to carry out extension or retraction along the first threaded rod 5222; the first sliding block 5223 is mounted in the inner sides of the first telescopic rack 5221 by two parallel linear guide rails, and is connected with the first threaded rod 5222 by a screw thread; the first sliding block 5223 is connected with the working arm mounting seat 51 by the first rear hinge 523; and the second telescopic set 532, the third telescopic set 542 and the fourth telescopic set 552 are totally the same as the first telescopic set 522 in structure. The first telescopic set 522, the second telescopic set 532, the third telescopic set 542 and the fourth telescopic set 552 act as moving pairs in the parallel working arm 5, and driving power of the first telescopic set 522, the second telescopic set 532, the third telescopic set 542 and the fourth telescopic set 552 is respectively provided by the first driving motor 5224, a second driving motor 5324, a third driving motor 5424 and a fourth driving motor 5524.

By such design, functions of the moving pairs in four branch chains of the parallel working arm 5 is achieved by the telescopic sets, with simple and compact structure, and structural stiffness and torsion resistance of the moving pairs in the first branch chain 52, the second branch chain 53, the third branch chain 54 and the fourth branch chain 55 are ensured, and the threaded rod for driving the sliding block to move only bears an axial load without bearing a shearing force and a torsion, which can effectively reduce cost of driving power in the moving pairs; and by strictly limiting a size constraint type among axes of the front universal joints, the front hinges, the rear hinges and the vertical hinges in the first branch chain 52, the second branch chain 53, the third branch chain 54 and the fourth branch chain 55, i.e., limiting a parallel, coaxial or perpendicular relationship among the axes, the four-degree-of-freedom parallel mechanism formed by the parallel working arm 5 and the end actuator 6 in the present invention can be uniquely limited to carry out accurate motion and attitude adjustment according to four set freedom degrees of two translational freedom degrees and two rotational freedom degrees in space. Other components and connection relationships are the same as those in Specific Embodiment I.

Specific Embodiment III

Figure 10:
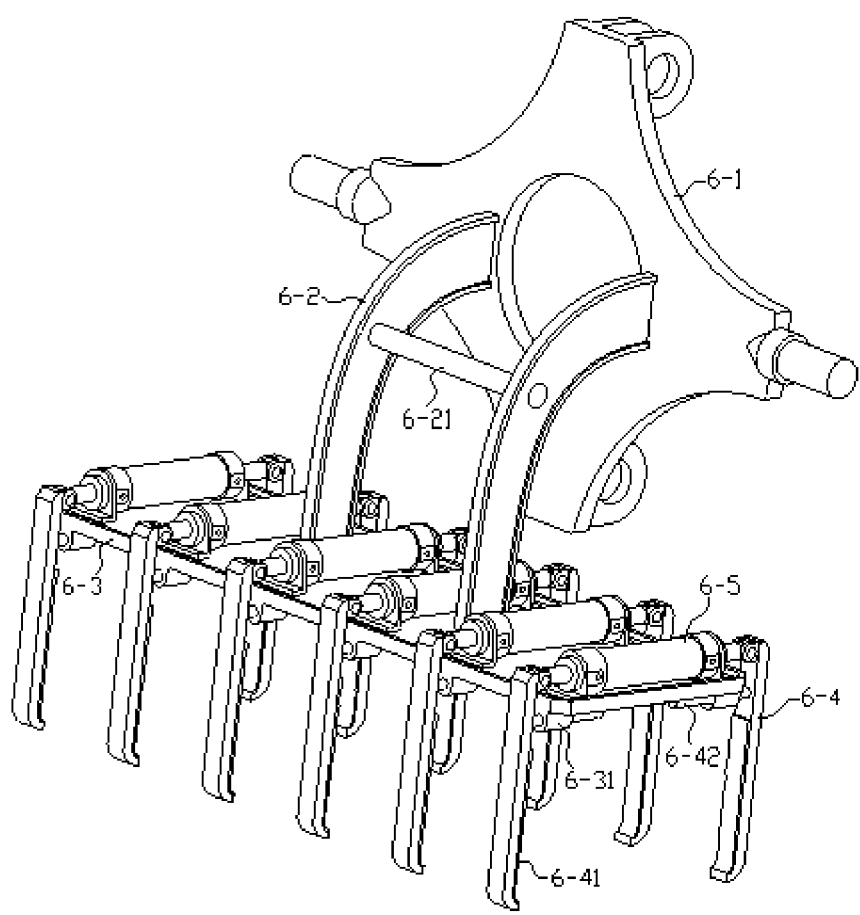
FIG. 10 is a structural schematic diagram of a multi-finger asynchronous type pneumatic gripper of the present invention.

As shown in FIG. 1, FIG. 10 and FIG. 11, the end actuator 6 particularly adopts a multi-finger asynchronous type pneumatic gripper which includes a pneumatic gripper connecting seat 6-1, a connecting bracket 6-2, a pneumatic gripper mounting plate 6-3, clamping gripper fingers 6-4 and finger cylinders 6-5, wherein the pneumatic gripper connecting seat 6-1 is fixedly mounted at the front end of the parallel working arm 5; the upper end of the connecting bracket 6-2 is fixedly connected with the pneumatic gripper connecting seat 6-1, the lower end of the connecting bracket 6-2 is fixedly connected with the top of the pneumatic gripper mounting plate 6-3, and a reinforcing connecting rod 6-21 is also arranged at the middle portion of the connecting bracket 6-2; guide sleeves 6-31 are arranged at the bottom of the pneumatic gripper mounting plate 6-3, anti-skid rubber 6-41 is arranged at the inner side of the lower ends of the clamping gripper fingers 6-4, guide rods 6-42 are arranged at the inner side of the upper ends of the clamping gripper fingers 6-4, and the guide rods 6-42 are sleeved into the guide sleeves 6-31 and are connected with the guide sleeves 6-31 by linear bearings; the finger cylinders 6-5 are fixedly mounted on the pneumatic gripper mounting plate 6-3, both ends of the finger cylinder 6-5 are respectively connected with two clamping gripper fingers 6-4 by hinges, and the finger cylinders 6-5 are double-acting cylinders; and an electromagnetic reversing valve and a safety valve are also arranged at the top of the pneumatic gripper mounting plate 6-3. The guide rods 6-42 of the clamping gripper fingers 6-4, under the drive of the finger cylinders 6-5, can slide along the guide sleeves 6-31 to achieve an effect that the clamping gripper fingers 6-4 mounted at both ends of the same finger cylinders 6-5 carry out actions of loosening and clamping, so as to implement independent loosening and clamping of each pair of clamping gripper fingers 6-4 and implement effective contact-fit gripping for the special-shaped sand core or casting. A range of pair numbers of the clamping gripper fingers 6-4 is 4 to 12. By such design, the multi-finger asynchronous type pneumatic gripper is utilize to replace the casting ladle for gripping the sand core assembly and the integral sand core or casting, which can enable the series-parallel movable heavy-load casting robot to have functions of core assembling, core setting and casting carrying, and further expands the use functions of the series-parallel movable heavy-load casting robot. Other components and connection relationships are the same as those in Specific Embodiment I or Specific Embodiment II.

Specific Embodiment IV

Figure 4:
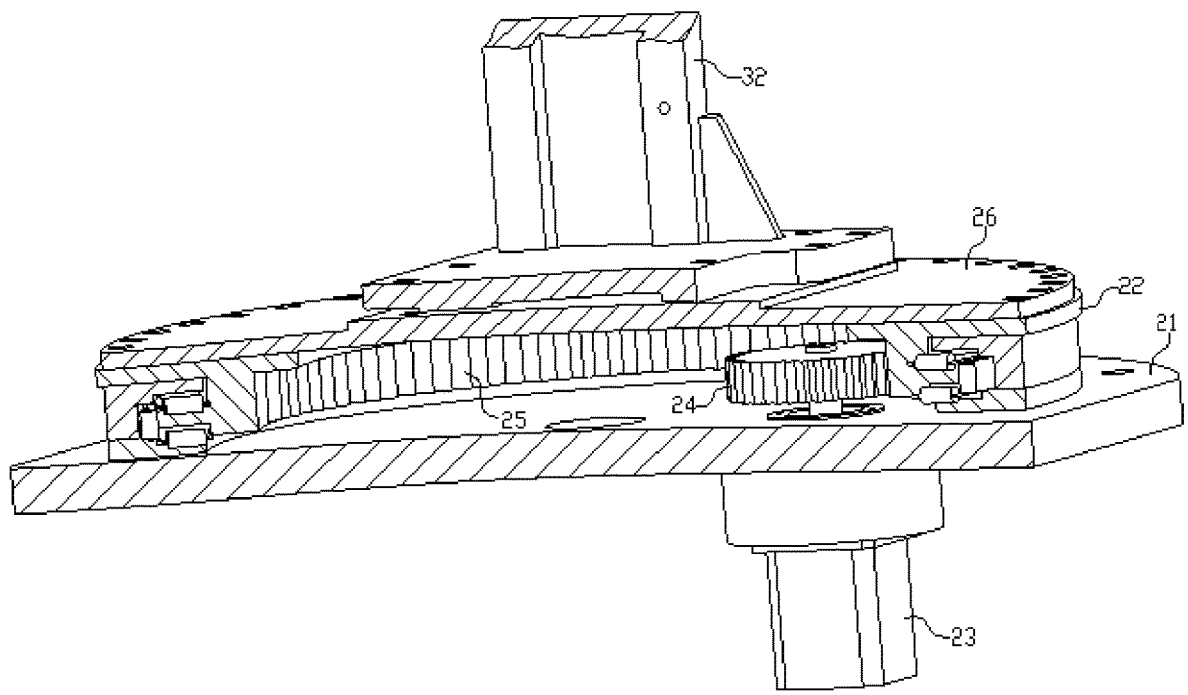
FIG. 4 is a structural schematic diagram of a rotating device of the present invention.
Figure 5:
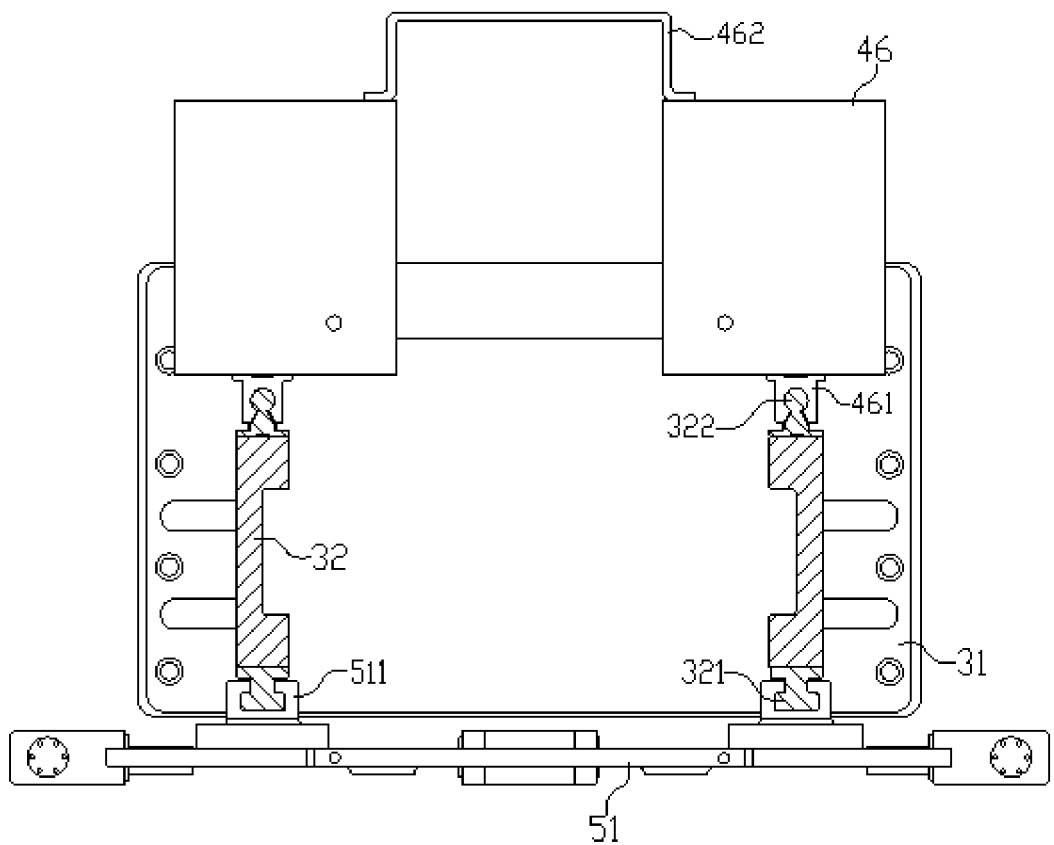
FIG. 5 is a view taken along a section line A-A in FIG. 2.
Figure 6:
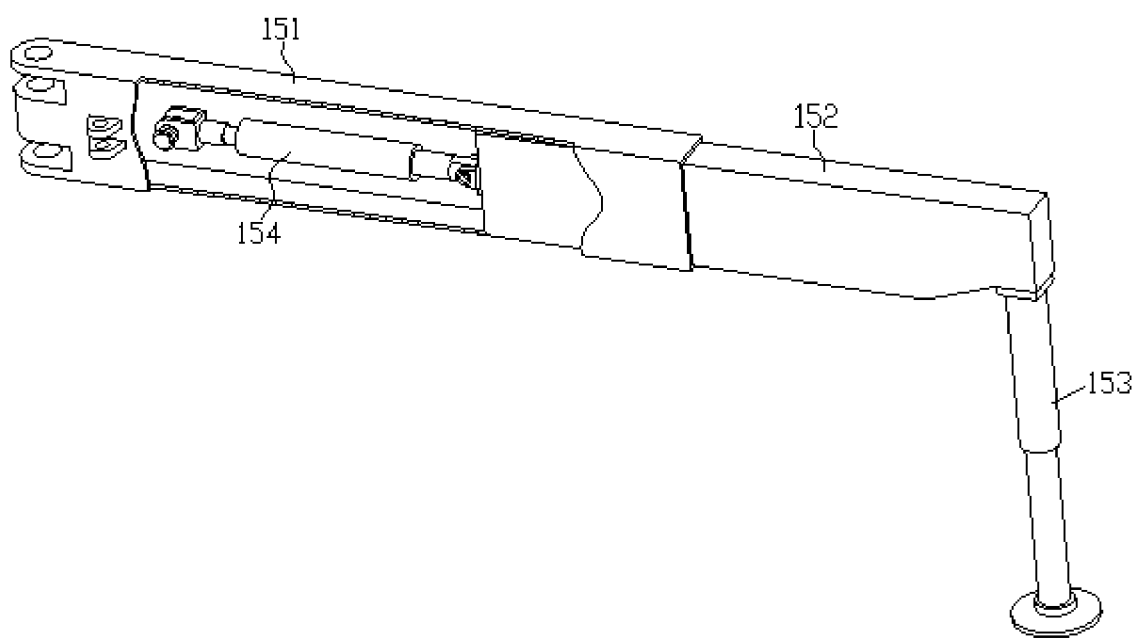
FIG. 6 is a structural schematic diagram of a parallel working arm of the present invention.
Figure 7:
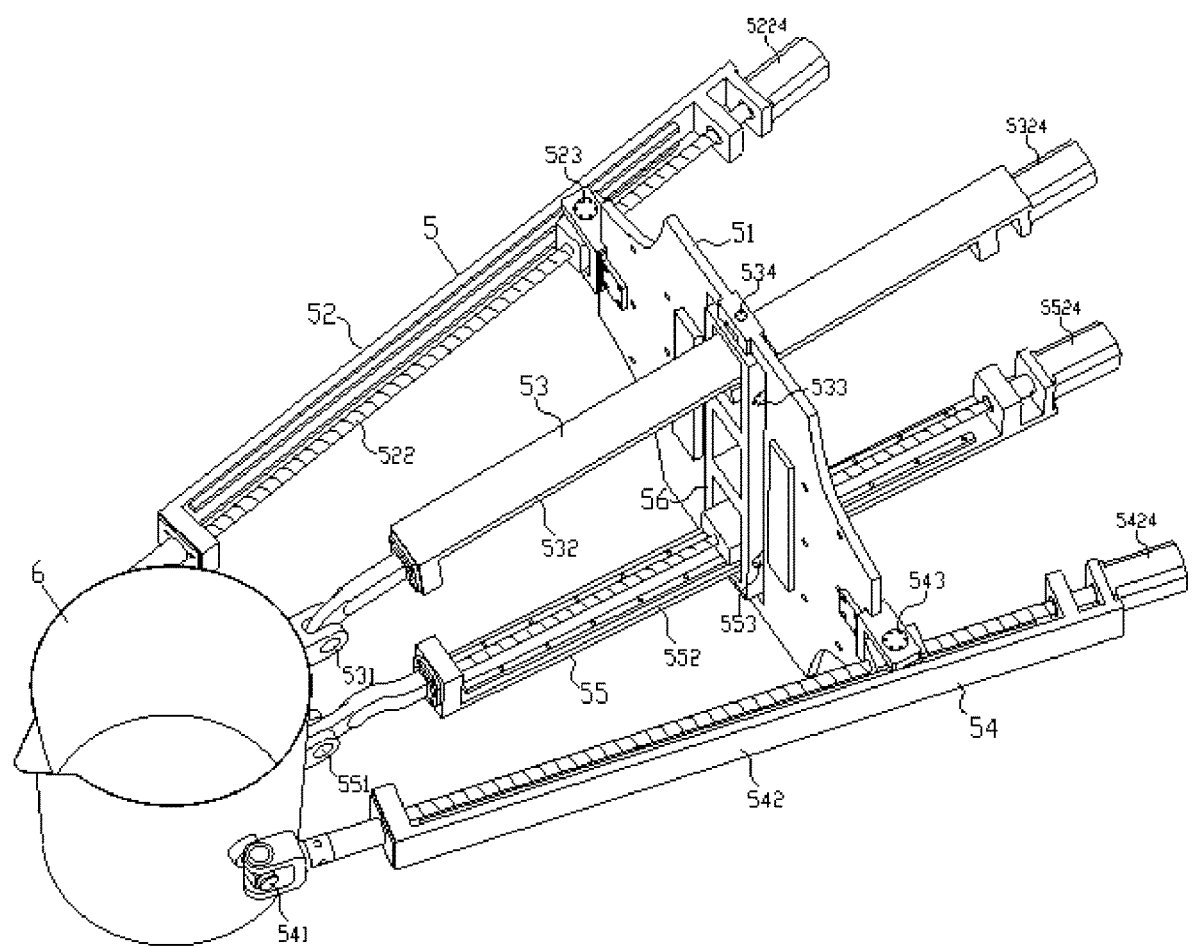
FIG. 7 is a structural schematic diagram of an adjustable hydraulic supporting leg (not including a swing angle adjusting cylinder) of the present invention.
Figure 8:
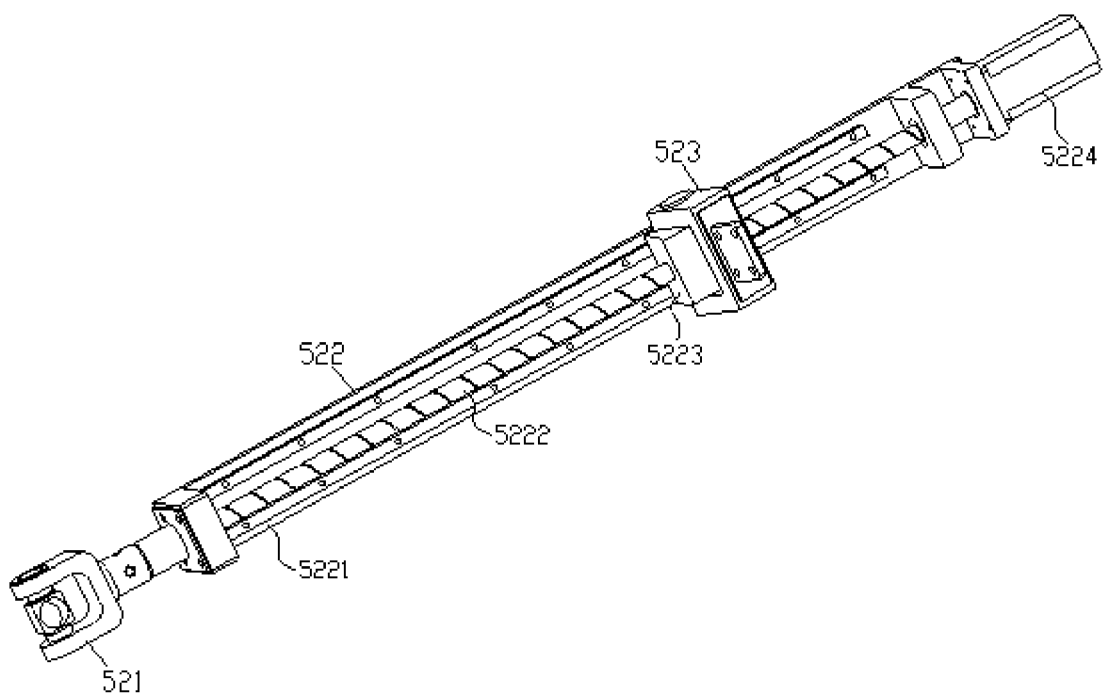
FIG. 8 is a structural schematic diagram of a first branch chain of the parallel working arm of the present invention.
Figure 9:
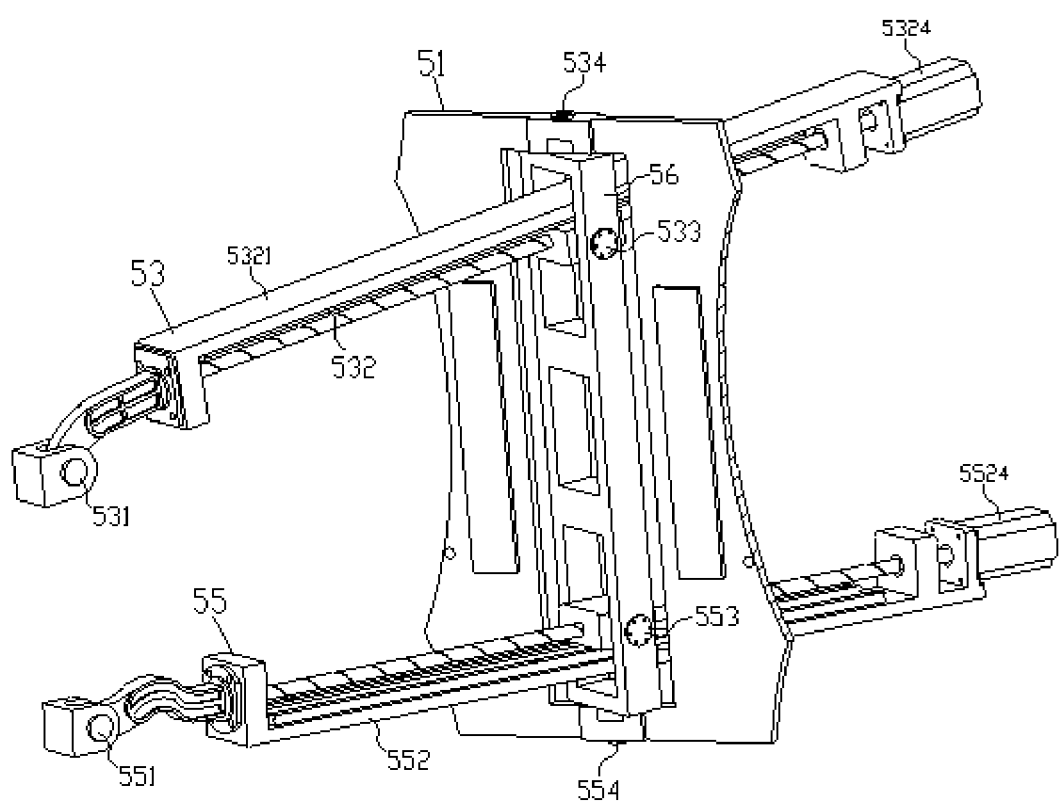
FIG. 9 is a structural schematic diagram of a second branch chain and a fourth branch chain of the parallel working arm of the present invention.

As shown in FIG. 1, FIG. 4 and FIG. 11, in the embodiment, the rotating motor 23 adopts a servo gear motor. By such design, the direct-current servo motor has a high rotating speed, and can provide a relatively large torque when being matched with a corresponding RV precision speed reducer; and in addition, the direct-current servo motor can also implement closed-loop control and can achieve relatively high transmission accuracy. Other components and connection relationships are the same as those in Specific Embodiment I, II or III.

Specific Embodiment V

Figure 2:
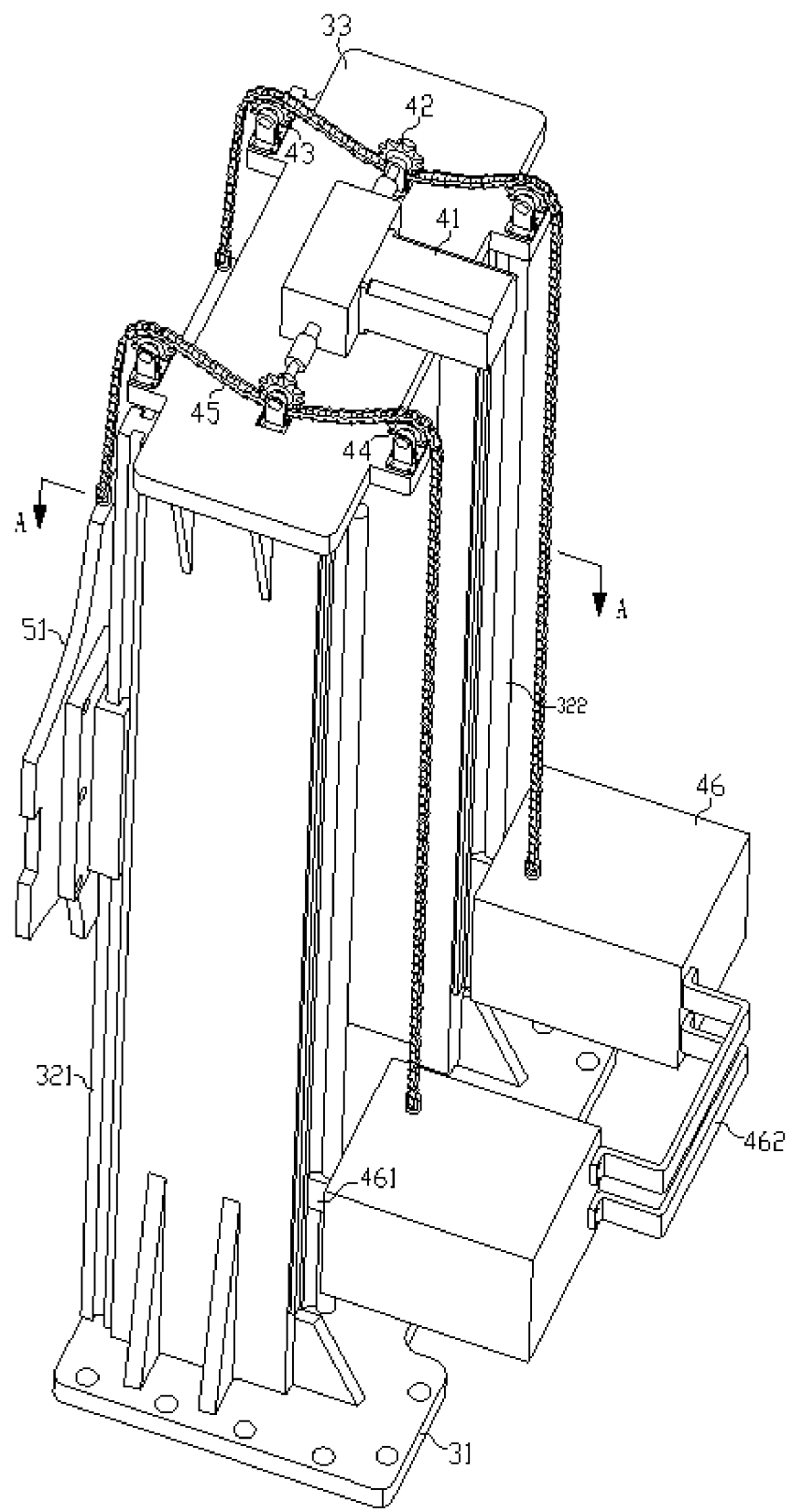
FIG. 2 is a structural schematic diagram of an upright assembly and a lifting drive device of the present invention.

As shown in FIG. 1 and FIG. 2, in the embodiment, the lifting motor 41 adopts a servo gear motor. By such design, the direct-current servo motor has a high rotating speed, and can provide a relatively large torque when being matched with a corresponding RV precision speed reduction device; and in addition, the direct-current servo motor can also implement closed-loop control and can achieve relatively high transmission accuracy. Other components and connection relationships are the same as those in Specific Embodiment I, II, III and IV.

Specific Embodiment VI

As shown in FIG. 1, FIG. 3, FIG. 6 and FIG. 11, in the embodiment, the adjustable hydraulic supporting legs 15 not only can swing left and right, but also can extend or retract. The adjustable hydraulic supporting leg 15 includes a supporting leg box 151, a telescopic arm 152, a vertical supporting leg 153, a telescopic cylinder for the supporting leg 154 and a swing angle adjusting cylinder 155, wherein the supporting leg box 151 is of a hollow structure, the rear end of the supporting leg box 151 is connected with the platform frame 11 by a hinge, and an angle sensor is arranged at the rear end of the supporting leg box 151 and used for detecting a left and right swing angles of the supporting leg box 151; the rear end of the telescopic arm 152 is sleeved into the supporting leg box 151 and can slide in the supporting leg box 151; the telescopic cylinder for the supporting leg 154 is mounted in the supporting leg box 151 and is used for driving the telescopic arm 152 to slide along the supporting leg box 151 so as to achieve a telescopic function of the adjustable hydraulic supporting leg 15, and both front and rear ends of the telescopic cylinder for the supporting leg 154 are respectively connected with the telescopic arm 152 and the supporting leg box 151 by hinges; the top of the vertical supporting leg 153 is fixedly mounted at the tail end of the front portion of the telescopic arm 152; and both ends of the swing angle adjusting cylinder 155 are respectively connected with the platform frame 11 and the supporting leg box 151 by hinges, and the telescopic cylinder for the supporting leg 154 and the swing angle adjusting cylinder 155 adopt double-acting hydraulic cylinders and are used for driving the supporting leg box 151, the telescopic arm 152 and the vertical supporting leg 153 to swing left and right around the hinge axis of the rear end of the supporting leg box 151. A displacement sensor is also arranged on the telescopic cylinder for the supporting leg 154 and is used for detecting a movement displacement of the telescopic arm 152 relative to the supporting leg box 151. Driving power of the rear hydraulic supporting leg 14 and the vertical supporting leg 153 adopts an electro-hydraulic servo oil cylinder or an electro-hydraulic stepping hydraulic cylinder. By such design, the rear hydraulic supporting leg 14 and the adjustable hydraulic supporting leg 15 can carry out automatic adjustment according to a static inclination angle of the four-driving-wheel type moving platform 1 relative to a horizontal plane, which is measured by the digital dual-axis level gauge in the platform frame 11, so as to achieve a self-balancing function of the four-driving-wheel type moving platform 1 in the stationary point supporting state, and the anti-overturning ability of the four-driving-wheel type moving platform 1 of the present invention in the heavy-load operation process can also be improved. Other components and connection relationships are the same as those in Specific Embodiment I, II, III, IV or V.

In use, firstly, proper end actuators 6 are selected according to tasks of casting operations, when a pouring task is executed, the casting ladle is selected as the end actuator, and when tasks of core taking, core assembling, core setting and carrying are executed and particularly when an operation object is the special-shaped sand core or casting, the multi-finger asynchronous type pneumatic gripper can be selected as the end actuator. Then, the front driving wheels 12 and the rear driving wheels 13 are started up according to operation requirements to enable the four-driving-wheel type moving platform 1 to walk to a designated operation position in a workshop, then the rotating device 2 and the lifting drive device 4 are respectively adjusted according to operation attitude and height requirements, and by forward rotation or reverse rotation of the first driving motor 5224, the second driving motor 5324, the third driving motor 5424 and the fourth driving motor 5524, the parallel working arm 5 of the present invention is adjusted so as to adjust the end actuator 6 to the proper operation attitude and operation height. When a stationary point operation is executed and particularly when pouring and carrying are carried out to a casting with a relatively large weight, the front driving wheels 12 and the rear driving wheels 13 are possible slip or be instable so as to influence operation accuracy of the casting robot, the swing angle of the adjustable hydraulic supporting legs 15 needs to be adjusted, and meanwhile, the rear hydraulic supporting legs 14 and the vertical supporting legs 153 of the adjustable hydraulic supporting legs 15 extend so as to implement stationary point stable supporting of the four-driving-wheel type moving platform 1. The position and distance information acquired by the navigation sensors and the distance measure sensors, the image information acquired by the binocular vision system, vertical displacement and rotation angle information of the end actuator, real-time working state parameters of the casting robot and the like are all visually displayed on the monitor 17, and information analysis and processing tasks of the attitude adjustment, operation tasks or the like of the casting robot are completed by the controller 16.

In the description of the present invention, it should be understood that directional or positional relationships shown by terms such as "upper", "lower", "left", "right", "horizontal", "top", "bottom", "inner", "outer", "front", "rear" and the like are directional or positional relationships shown as in the drawings, which only means to facilitate description of the present invention and simplify the description and does not indicate or imply that the devices or components must have specific orientations or be constructed or operated in the specific orientations, and thus the description is not limitative of the present invention.

The above displays and describes the basic principle, main characteristics and advantages of the present invention. Those skilled in the art should understand that the present invention is not limited to the above-mentioned embodiments, the above-mentioned embodiments and description in the specification are only to illustrate the principle of the present invention, various changes and improvements can also be made to the present invention without departure from the spirit and the scope of the present invention, and those changes and improvements shall fall within the scope of the present invention. The scope of the present invention is determined by the appended claims and equivalents thereof.

The invention claimed is:

1. A series-parallel movable heavy-load casting robot, comprising:
    a four-driving-wheel type moving platform, a rotating device, an upright assembly, a lifting drive device, a parallel working arm, an end actuator and a binocular vision system;
    wherein the four-driving-wheel type moving platform includes a platform frame, front driving wheels, rear driving wheels, rear hydraulic supporting legs, adjustable hydraulic supporting legs, a controller, a monitor and a hydraulic pump station;
    two front driving wheels are mounted at a front end of the platform frame, two rear driving wheels are mounted at a rear end of the platform frame, two rear hydraulic supporting legs are symmetrically mounted on two corners of a rear portion of the platform frame, the adjustable hydraulic supporting legs are mounted on both sides of a front portion of the platform frame;
    the controller is arranged at a middle portion of the rear end of the platform frame, the monitor is fixedly mounted at the top of the controller, and the hydraulic pump station is fixedly mounted on a left side of the rear end of the platform frame; the rotating device is fixedly mounted at a front end of the four-driving-wheel type moving platform, the upright assembly is positioned directly above the rotating device, and a bottom of the upright assembly is fixedly mounted at on the rotating device; the lifting drive device is fixedly mounted on the upright assembly, and a front end of the lifting drive device is connected with a rear end of the parallel working arm by a hinge; the parallel working arm has a four-degree-of-freedom parallel mechanism which is of a 2RPU-2RRPR structure, the end actuator is mounted at a front end of the parallel working arm, and the rear end of the parallel working arm is mounted on the upright assembly and is configured to slide up and down along the upright assembly;
    the binocular vision system includes two industrial cameras, an image acquisition card and an industrial computer, the two industrial cameras are provided and with light-emitting diode (LED) illumination light sources, the image acquisition card is integrally mounted in the monitor, the industrial computer is integrally mounted in the controller, the two industrial cameras are connected with the image acquisition card by data lines, and the image acquisition card is connected with the industrial computer by a data line;
    the rotating device includes a rotating base, a rotating body, a rotating motor, a rotating gear, an inner gear ring and a rotating top cover, and the rotating base is fixedly mounted on the platform frame by a screw;
    the rotating body is sleeved into the rotating base and is connected with the rotating base by a radial bearing and two thrust bearings, the radial bearing adopts a radial cylindrical roller bearing, and the two thrust bearings are cylindrical roller thrust bearings;
    the rotating motor is fixedly mounted below the rotating base, and the rotating gear is mounted on an output shaft of the rotating motor;
    the inner gear ring is fixedly mounted in the rotating body by a screw, and is internally meshed with the rotating gear;
    the rotating top cover is fixedly mounted at the top of the rotating body, and an angle sensor is arranged at a center of a bottom of the rotating top cover;
    the upright assembly includes an upright base, two uprights and a top beam, the upright base is positioned above the rotating top cover and is fixedly connected with the rotating top cover by a screw, the two uprights are bilaterally symmetrically arranged between the upright base and the top beam and are both fixedly connected with the upright base and the top beam, a long-displacement sensor is arranged on an inner side surface of one upright, front linear guide rails are fixedly mounted on front side surfaces of the two uprights, rear linear guide rails are fixedly mounted on rear side surfaces of the two uprights, and the rear linear guide rails adopt a-shaped linear guide rails;

the lifting drive device includes a lifting motor, two driving sprockets, two front guide sprockets, two rear guide sprockets, two chains and counter weight blocks;

the two driving sprockets, the two front guide sprockets, the two rear guide sprockets and the two chains are bilaterally symmetrically arranged on the upright assembly, the lifting motor is fixedly mounted at a middle position of the top of the top beam, the two driving sprockets are positioned on both sides of the middle portion of the top beam and fixedly mounted on an output shaft of the lifting motor, the two front guide sprockets are fixedly mounted on a front side surface of the top beam, and the two rear guide sprockets are fixedly mounted on rear side surfaces of the top beam;

front ends of the chains are connected with the top of the rear end of the parallel working arm by hinges, rear ends of the chains are connected with the counter weight blocks by hinges, and the chains are simultaneously meshed with the driving sprockets, the front guide sprockets and the rear guide sprockets;

the counter weight blocks are positioned on rear sides of the two uprights, two rear sliding blocks are symmetrically arranged at front ends of the counter weight blocks and are connected with the rear linear guide rails on the two uprights by sliding pairs; and the parallel working arm includes a working arm mounting seat, a first branch chain, a second branch chain, a third branch chain and a fourth branch chain, the working arm mounting seat is positioned at front sides of the two uprights, four rear sliding blocks are symmetrically arranged on a rear end face of the working arm mounting seat and are connected with the front linear guide rails of the two uprights by sliding pairs, the first branch chain and the third branch chain are totally the same in structure, mechanism topological structures of both the first branch chain and the third branch chain are RPU structures, and the first branch chain and the third branch chain are bilaterally symmetrically arranged on the working arm mounting seat; and the second branch chain and the fourth branch chain are totally the same in structure, mechanism topological structures of both the second branch chain and the fourth branch chain are RRPR structures, and the second branch chain and the fourth branch chain are bilaterally symmetrically arranged on the working arm mounting seat.

2. The series-parallel movable heavy-load casting robot according to claim 1, wherein the first branch chain includes a first front universal joint, a first telescopic set and a first rear hinge, an inner side end of the first rear hinge is fixedly connected with the working arm mounting seat, a rear end of the first telescopic set is connected with an outer side end of the first rear hinge by a sliding pair, a front end of the first telescopic set is fixedly connected with a rear end of the first front universal joint, and a front end of the first front universal joint is fixedly connected with the end actuator; the second branch chain includes a first front hinge, a second telescopic set, a second rear hinge and a first vertical hinge, a front end of the first front hinge is fixedly connected with the end actuator, a front end of the second telescopic set is fixedly connected with a rear end of the first front hinge, a rear end of the second telescopic set is connected with an upper end of the second rear hinge by a sliding pair, a lower end of the first vertical hinge is fixedly connected with the upper end of the second rear hinge, and a top of the first vertical hinge is fixedly mounted on the working arm mounting seat; the fourth branch chain includes a second front hinge, a fourth telescopic set, a fourth rear hinge and a second vertical hinge, a front end of the second front hinge is fixedly connected with the end actuator, a front end of the fourth telescopic set is fixedly connected with a rear end of the second front hinge, a rear end of the fourth telescopic set is connected with a lower end of the fourth rear hinge by a sliding pair, an upper end of the second vertical hinge is fixedly connected with the lower end of the fourth rear hinge, a bottom of the second vertical hinge is fixedly mounted on the working arm mounting seat, and the lower end of the first vertical hinge is fixedly connected with the upper end of the second vertical hinge;

the first telescopic set includes a first telescopic rack, a first threaded rod, a first sliding block and a first driving motor, and a front end of the first telescopic rack is fixedly connected with the rear end of the first front universal joint; both ends of the first threaded rod are mounted on the first telescopic rack by bearing seats, and the first driving motor is fixedly mounted at a rear end of the first telescopic rack and is connected to a rear end of the first threaded rod by a coupler; the first sliding block is mounted in inner sides of the first telescopic rack by two parallel linear guide rails, and is connected with the first threaded rod by a screw thread; the first sliding block is connected to the working arm mounting seat by the first rear hinge; and the second telescopic set, the third telescopic set and the fourth telescopic set are totally the same as the first telescopic set in structure.

3. The series-parallel movable heavy-load casting robot according to claim 1, wherein the end actuator has a casting ladle or a two-claw clamping plate type pneumatic gripper or a three-finger type synchronous pneumatic gripper or a multi-finger asynchronous type pneumatic gripper.

4. The series-parallel movable heavy-load casting robot according to claim 1, wherein the counter weight blocks has a split structure, a number of the counter weight blocks can be increased along a front-and-back direction, and the counter weight blocks arranged one behind the other are connected by screws; and left and right counter weight blocks are connected by a U-shaped connecting rod.

5. The series-parallel movable heavy-load casting robot according to claim 1, wherein a digital dual-axis level gauge is arranged in the platform frame, and a measurement accuracy of the digital dual-axis level gauge is not lower than 0.01 degree; and the long-displacement sensor is a linear magnetic induction sensor or a linear grating sensor or a linear inductosyn.

6. The series-parallel movable heavy-load casting robot according to claim 2, wherein the front driving wheel and the rear driving wheel are Mecanum omnidirectional wheels; and both the rotating motor and the lifting motor are servo gear motors or servo hydraulic motors.

7. The series-parallel movable heavy-load casting robot according to claim 1, wherein the two industrial cameras are fixedly mounted on both sides of the front end of the top beam, and are connected with the top beam by a two-degree-of-freedom cradle head.

8. The series-parallel movable heavy-load casting robot according to claim 1, wherein the adjustable hydraulic supporting leg includes a supporting leg box, a telescopic arm, a vertical supporting leg, a telescopic cylinder for the supporting leg and a swing angle adjusting cylinder, the supporting leg box is a hollow structure, a rear end of the supporting leg box is connected with the platform frame by a hinge, a rear end of the telescopic arm is sleeved into the supporting leg box, the telescopic cylinder for the supporting leg is mounted in the supporting leg box, front and rear ends of the telescopic cylinder for the supporting leg are respectively connected with the telescopic arm and the supporting leg box by hinges, a top of the vertical supporting leg is fixedly mounted at a tail end of a front portion of the telescopic arm, both ends of the swing angle adjusting cylinder are respectively connected with the platform frame and the supporting leg box by hinges, and the telescopic cylinder for the supporting leg and the swing angle adjusting cylinder adopt double-acting hydraulic cylinders; and driving power of the rear hydraulic supporting leg and the vertical supporting leg is an electro-hydraulic servo oil cylinder or an electro-hydraulic stepping hydraulic cylinder.

9. The series-parallel movable heavy-load casting robot according to claim 2, wherein an axis of the first rear hinge is parallel to one axis of a cross shaft of the first front universal joint, and a horizontal axis of the cross shaft of the first front universal joint is coaxial with a horizontal axis of a cross shaft of the second front universal joint of the third branch chain; an axis of the first front hinge is parallel to an axis of the second rear hinge, the axis of the first front hinge is perpendicular to an axis of the first vertical hinge, the first vertical hinge and the second vertical hinge are coaxial, the axis of the first front hinge is parallel to an axis of the second front hinge, and the axis of the second front hinge is parallel to an axis of the fourth rear hinge; and axes of the first rear hinge, the first vertical hinge, the second vertical hinge and a third rear hinge on the third branch chain are parallel to each other.

10. The series-parallel movable heavy-load casting robot according to claim 3, wherein the multi-finger asynchronous type pneumatic gripper includes a pneumatic gripper connecting seat, a connecting bracket, a pneumatic gripper mounting plate, clamping gripper fingers and finger cylinders, and the pneumatic gripper connecting seat is fixedly mounted at the front end of the parallel working arm; both upper and lower ends of the connecting bracket are fixedly connected with the pneumatic gripper connecting seat and the pneumatic gripper mounting plate, respectively; guide sleeves are arranged at a bottom of the pneumatic gripper mounting plate, anti-skid rubber is arranged at an inner side of the lower ends of the clamping gripper fingers, guide rods are arranged at an inner side of the upper ends of the clamping gripper fingers, and the guide rods are sleeved into the guide sleeves and are connected with the guide sleeves by linear bearings; the finger cylinders are fixedly mounted on the pneumatic gripper mounting plate, both ends of the finger cylinder are respectively connected with two clamping gripper fingers by hinges, and the finger cylinders are double-acting cylinders; an electromagnetic reversing valve and a safety valve are arranged at the top of the pneumatic gripper mounting plate; a range of pair numbers of the clamping gripper fingers is 4 to 12, and each pair of clamping gripper fingers is independently connected and controlled by one finger cylinder.

\* \* \* \* \*